United States Patent
Blaser et al.

(10) Patent No.: US 11,520,551 B2
(45) Date of Patent: Dec. 6, 2022

(54) METHODS AND SYSTEMS FOR WIRELESS POWER AND DATA TRANSFERS BETWEEN ELECTRONIC DEVICES

(71) Applicant: Mobile Tech Inc., Hillsboro, OR (US)

(72) Inventors: Robert Logan Blaser, Farmington, UT (US); Michael D. Miles, Portland, OR (US); Lincoln Wilde, Hillsboro, OR (US)

(73) Assignee: Mobile Tech, Inc., Hillsboro, OR (US)

( * ) Notice: Subject to any disclaimer, the term of this patent is extended or adjusted under 35 U.S.C. 154(b) by 78 days.

(21) Appl. No.: 17/066,881

(22) Filed: Oct. 9, 2020

(65) Prior Publication Data
US 2022/0113925 A1    Apr. 14, 2022

(51) Int. Cl.
*G06F 3/14* (2006.01)
*G09F 9/30* (2006.01)
*H02J 50/12* (2016.01)
*H04B 5/00* (2006.01)

(52) U.S. Cl.
CPC .............. *G06F 3/1423* (2013.01); *G09F 9/30* (2013.01); *H02J 50/12* (2016.02); *H04B 5/0037* (2013.01)

(58) Field of Classification Search
CPC ....... G09F 9/30; G06F 3/1423; H04B 5/0037; H02J 50/12
See application file for complete search history.

(56) References Cited

U.S. PATENT DOCUMENTS

| | | | |
|---|---|---|---|
| 2013/0088192 A1* | 4/2013 | Eaton | H04B 5/0087 320/108 |
| 2016/0183034 A1* | 6/2016 | Konanur | H04B 5/0031 455/41.1 |
| 2020/0278747 A1* | 9/2020 | Ligtenberg | H03K 17/9647 |

* cited by examiner

*Primary Examiner* — Muhammad N Edun

(57) ABSTRACT

Methods and system are directed to wireless and non-conductive transfers of power and data to electronic devices. The methods and systems can be implemented in retail security products, such merchandising display assembly for displaying devices such as smart phones, tablets, digital cameras, and wearables. In one aspect, a merchandising display assembly may include a wireless power transfer capability and a wireless data transfer capability. An electronic device may interface directly with the base position assembly or via an intermediary assembly. The interface may be accomplished without an electrical cable to transmit power and data from the base position assembly to the electronic device.

21 Claims, 21 Drawing Sheets

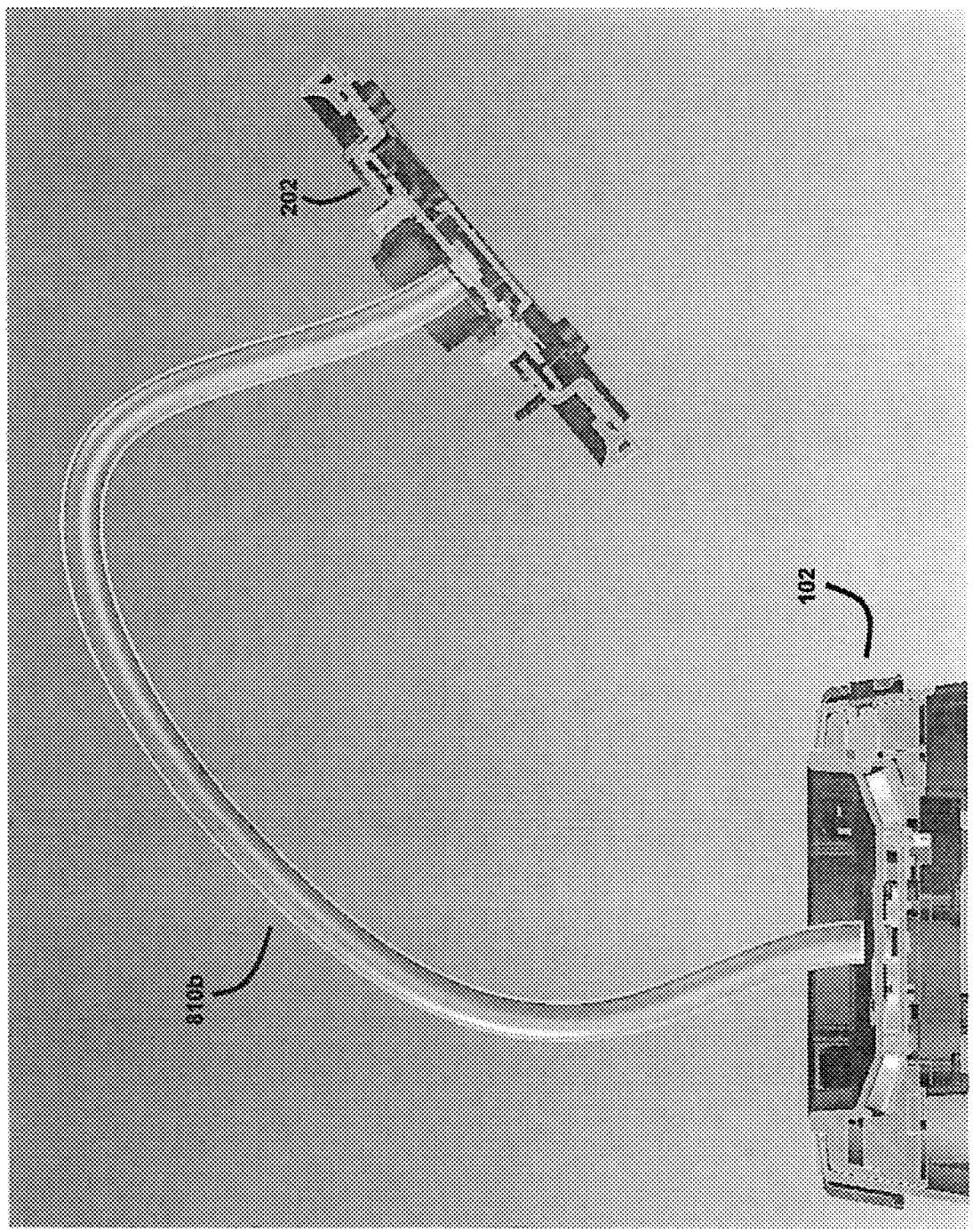

METHODS AND SYSTEMS FOR WIRELESS POWER AND DATA TRANSFERS BETWEEN ELECTRONIC DEVICES

TECHNICAL FIELD

The present disclosure is directed to wireless power and data transmission.

BACKGROUND

As usage of retail security and enclosure ecosystems to display and merchandise electronic devices, such as cell phones, tablets, cameras and laptops, in a retail setting continues to expand, there is an ever-increasing desire to include data connectivity and power/charge capabilities to the electronic devices. This data connectivity capability can be used for many different functions, including internet connectivity, video display connectivity, and/or USB accessory connectivity. Additional functions include administrative and infrastructural software and/or firmware updates or electronic device identification for remote monitoring and control (e.g., software unlock of a device) and/or use cases such as electronic device management ("MDM") to enable data collection and feature enablement.

There are also increasing needs for retail security and enclosure products that exhibit increased longevity against the demands of harsh, commercial usage. Traditionally, retail security products for securely displaying electronic devices have employed conductive connectors and cables that provide power/charging to the secured electronic devices. However, such connectors and cables are susceptible to wear and tear and field failures over time. The presence of cables connected to electronic devices tend to distract greatly from the user experience of interacting with a secured electronic device in a retail setting. In addition, with respect to docking systems or enclosures for electronic devices, the cables and connectors tend to require large cases to accommodate the physical limitations imposed with a cable/connector plugged into the tablet computer. In some cases, for example, conductive POGO pin contacts have been used for a quick disconnect interface to replace male/female-style conductive connectors, but even such conductive contacts suffer from contamination, mechanical wear and tear, and physical failure.

SUMMARY

Methods and system described herein are directed to wireless and non-conductive transfers of power and data to electronic devices. The methods and systems can be implemented in retail security products, such as merchandising display assemblies for displaying devices, such as smart phones, tablets, digital cameras, and wearables. In one aspect, a merchandising display assembly comprises a base position assembly that includes a wireless power transfer capability and a wireless data transfer capability to an electronic device. The merchandising display assembly may include an intermediary assembly, a puck (e.g., for retail security positions), or a case mount (e.g., for docking systems). The electronic device can interface with the base position assembly via the intermediary assembly, the puck, or the case mount. The interface between the base position assembly and the intermediary assembly may be accomplished without a tether and without an electrical cable to connect the base position assembly with the intermediary assembly.

DESCRIPTION OF THE DRAWINGS

FIG. 11 shows an example flexible conduit.

DETAILED DESCRIPTION

Figure 1:
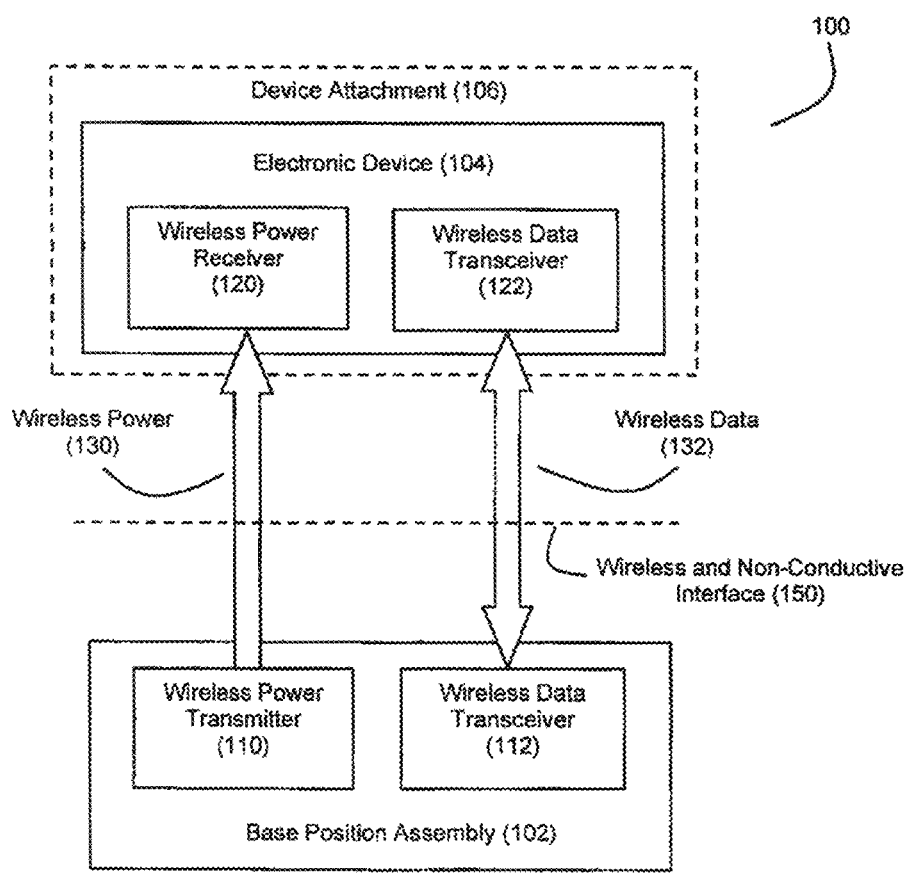
FIG. 1 shows an example system where a wireless and non-conductive interface is employed for directly transferring power and data with respect to a base position assembly and electronic device.

FIG. 1 shows an example system 100 where a wireless and non-conductive interface 150 is employed for directly transferring power and data between a base position assembly 102 and an electronic device 104. The electronic device 104 may be, but is not limited to, a smart phone, a tablet computer, wearable device (e.g., a smart watch or virtual reality (VR) goggles) or a digital camera.

The base position assembly 102 includes a wireless power transmitter 110 and a wireless data transceiver 112. The base position assembly 102 can take any of a number of forms depending on the use case. The base position assembly 102 may be a merchandising display assembly for a retail presentation of the electronic device 104 to customers. For example, the base position assembly 102 may be a display pad that is attached to, or is otherwise secured to, a display table. As another example, the base position assembly 102 may be a riser or display stand that can be attached to, or otherwise secured to, a display table. As yet another example, the base position assembly 102 may be a base mount of a docking system. Still other forms for the base position assembly 102 may be employed.

The base position assembly 102 can include a connection to a power source and corresponding circuitry for receiving electrical power from the power source. As described below, the electrical power can be transferred to the electronic device 104 via the wireless power transmitter 110. The base position assembly 102 may include a wireless node that can be a member of a wireless network such as a wireless mesh network with other base position assemblies. The wireless network allows for wireless data communication with a remote computer system. As described below, such a wireless connectivity with a remote computer system can allow the electronic device 104 to transmit data to the remote computer system via the wireless data transfer capability between the electronic device 104 and base position assembly 102 and the wireless connectivity between the wireless node of the base position assembly 102 and the remote computer system. Similarly, such a wireless connectivity with a remote computer system can allow the remote computer system to communicate data to the electronic device 104 via a reverse path.

The wireless power transmitter 110 includes one or more inductive transmit coils and corresponding circuitry. When an alternating current ("AC") is sent through the transmit coils, the AC creates a magnetic field around the wireless power transmitter 110. The strength of the magnetic field fluctuates with fluctuations in the strength of the AC sent through the transmit coils. The fluctuating magnetic field around the wireless power transmitter 110 creates an electromotive force. The wireless power transmitter 110 can be driven with electrical power received from electrical power delivered to the base position assembly 102 via an external power source. Also, the wireless power transmitter 110 includes any of a number of inductive charging techniques. For example, the inductive power transmitter 110 can employ resonant inductive coupling, such Qi inductive power transfer circuitry. As another example, the inductive power transmitter 110 can employ PMA inductive power transfer circuitry. However, it should be understood that other techniques for wireless power transfer could be employed by the wireless power transmitter 110.

The wireless data transceiver 112 may receive modulated signals that data encoded signals to be sent to and from the electronic device 104. The wireless data transceiver 112 includes one or more wireless transceivers and corresponding circuitry for bidirectional communication of wireless data transmission 132. In an example embodiment, the wireless data transceiver 112 can provide short-range (such as near field) wireless connectivity rather than longer range wireless connectivity so as to reduce the potential for interference problems. For example, the short range for wireless connectivity can be on the order of millimeters. However, longer range distances can be achieved by using lenses and/or conduits that propagate the wireless data transmission 132 to targeted locations. For example, as noted above plastic lenses and/or plastic conduits can be used to propagate EHF wireless data transmission 132.

Examples of w fireless data transfer techniques that can be implemented by the wireless data transceiver 112 include Qi data transfer, near field communication ("NFC") data transfer, RFID data transfer, infrared ("IR") data transfer, optical data transfer, and/or near field high frequency data transfer, such as via an EHF carrier that can transport data wirelessly point-to-point over short distances through air and plastic.

Examples of transport techniques that can be employed for the wireless data transmission 132 include USB transport, video transport, GPIO transport, and/or custom transport. Other examples include longer range wireless data transfer techniques for wireless data transceiver 132, such as WiFi, Bluetooth, ANT, and Zigbee. However, short range/ near data transceivers are advantageous because short range/ near data transceivers are less susceptible noise interference and other environmental variables that can lead to unreliable performance.

Near field high data rate wireless data transfer solutions, such as NFC, may be capable of transmitting data at about 5 or more gigabits per second, with potential upward ceilings of about 25-30 gigabits per second per interface. Due to the high-frequency nature of these protocols and properties of certain materials with EHF electromagnetic energy (within a range between about 30-300 GHz, for example about 60 GHz or more electromagnetic energy), there are many options which can be used to keep wireless transmissions isolated from each other as well as localized. As a result, multiple, independent, wireless interfaces may be located close to each other in order to increase function and overall data rate. When used as a general radiator, the high frequency wireless data transceiver 112 can operate effectively over distances on the order of millimeters, although as noted longer distances can be achieved for high frequency emissions using lenses and conduits as described below.

The wireless power transmitter 110 and wireless data transceiver 112 may be located near a surface of the base position assembly 102 on which the electronic device 104 will rest in order to interact with a corresponding wireless power receiver 120 and a wireless data transceiver 122 when the electronic device 104 is brought into proximity with the surface. When the wireless power receiver 120 is located within the fluctuating magnetic field created by the wireless power transmitter 110 (i.e., in proximity), the electromotive force creates an AC in an induction coil of the wireless power receiver 120 that is passed through a rectifier and is used to charge a battery of the electronic device 104 or provide electrical power to the electronic device 104. The process of using the wireless power transmitter 110 to create a fluctuating magnetic field that in turn creates electrical power at the wireless power receiver 120 is called "inductive charging" and is represented by a directional arrow 130 identified as wireless power transmission. The positioning relative to the base position assembly surface can vary based on the capabilities of the techniques selected for wireless power and data transmission in particular implementations. In an example embodiment, the surface of the base position assembly 102 on which the electronic device 104 rests may be made of a thin material that is transmissive with respect to the signals for the wireless power transmission 130 and wireless data transmission 132 so that the wireless power transmission 130 and wireless data transmission 132 are operably transferred over the interface 150 when the electronic device 104 is in proximity to the base position assembly 102. In another example embodiment, some classes of wireless signals (such as higher frequency signals (e.g., around 60 GHz) exhibit propagation characteristics through plastics. Accordingly, if the wireless signals passed over interface 150 have a sufficiently high frequency, plastic surfaces or components of the base position assembly may be shaped or contoured to act as a lens or a conduit for the propagation of the wireless data transmission 1_32. This may permit greater spacing of the wireless data transceivers 112 and 122 relative to each other. As another example, the base position assembly 102 can include gaps, holes, recesses, and/or a geometrical shape in the surface that allows a clear over-the-air path for the wireless power and/or data signals.

The electronic device 104 shown in FIG. 1 includes a wireless power receiver 120 and a wireless data transceiver 122. In addition to these components, the electronic device 104 may include additional circuitry and features that are particular to the type of electronic device 104 being used, whether it be a smart phone, tablet computer, digital camera, or a laptop. The wireless power receiver 120 and wireless data transceiver 122 may be native components of the electronic device 104, and would typically be located near an external surface of the electronic device (e.g., for a smart phone, near a back surface of the smart phone) for ease of connectivity over the interface 150. The wireless power receiver 120 can include an inductive receive coil and corresponding circuitry that are complementary and inter-operable with the wireless power transmitter 110 employed in the base position assembly 102. Likewise, the wireless data transceiver 122 can be complementary and inter-operable with the wireless data transceiver 112 employed in the base position assembly 102.

The wireless data transceiver 122 may support a communication protocol that allows the electronic device 104 to wirelessly communicate identifying information about the electronic device 104 and/or status information about the electronic device 104. Having wireless access to such information about the electronic device 104 via the wireless data transceiver 122 greatly expands remote monitoring and control capabilities that can be exerted on system 100 via connectivity with a remote computer system. The wireless connection via wireless data transceiver 122 and wireless data transceiver 112 can be a wireless USB connection that allows for the transfer of identifying information about the electronic device 104 and/or status information about the electronic device 104. For wireless connections that are non-USB, different descriptors may be employed to communicate such information.

System 100 may include a device attachment 106 for the electronic device 104. The device attachment 106 can take any of a number of forms, but it need not play any active role in the wireless interface 150 (beyond not impeding the operability of the wireless interface 150). An example of a device attachment 106 for electronic device 104 can be a mounting puck or security sensor, such as flexible adhesive sensor that attaches to the electronic device 104, that can support the electronic device 104 and/or provide security features, such as alarms, in the event of unauthorized removal of the electronic device 104 from the mounting puck or security sensor. Another example of a device attachment 106 can be a case mount as can be used in a docking system for tablet computers. Such a case mount can provide a secure enclosure for a tablet computer and permit docking with a base mount of the docking system. The device attachment 106 can be designed with materials and form factor so as to not impede the operability of the wireless interface 150. For example, the device attachment 106 can be made of a thin material that is transmissive with respect to the wireless power transmission 130 and wireless data transmission 132 so that the wireless power transmission 130 and wireless data transmission 132 are operably transferred over the interface when the electronic device 104 is in proximity to the base position assembly 102. As another example, for classes of wireless signals as discussed above, such as higher frequency signals (e.g., around 60 GHz), which exhibit excellent propagation characteristics through plastics, the plastic surfaces or components of the device attachment 106 may be shaped or contoured to act as a lens or a conduit for the propagation of the wireless data transmission 132. As another example, the device attachment 106 can include gaps, holes, recesses, and/or a geometric shape that allows a clear over-the-air path for the wireless power and/or data signals.

Security in the example of FIG. 1 can be provided in any of a number of ways. For example, a mechanical tether (e.g., steel retractor cable) could be used to physically link the base position assembly 102 with the device attachment 106. However, in a system 100 without a tether, wireless signals can be used to provide spatial geo-fencing and/or proximity detection that can trigger alarms or other actions in response to detecting the electronic device 104 as moving too far from the base position assembly 102 or other reference point. Accordingly, wireless transceivers could be included in the base position assembly 102 and the electronic device 104 and/or device attachment 106 to define the wireless geo-fence and/or proximity detection capabilities. A battery can be included in the device attachment 106 for powering the circuitry used for operations of the device attachment 106 with respect to the wireless geo-fence and/or proximity detection.

Figure 2:
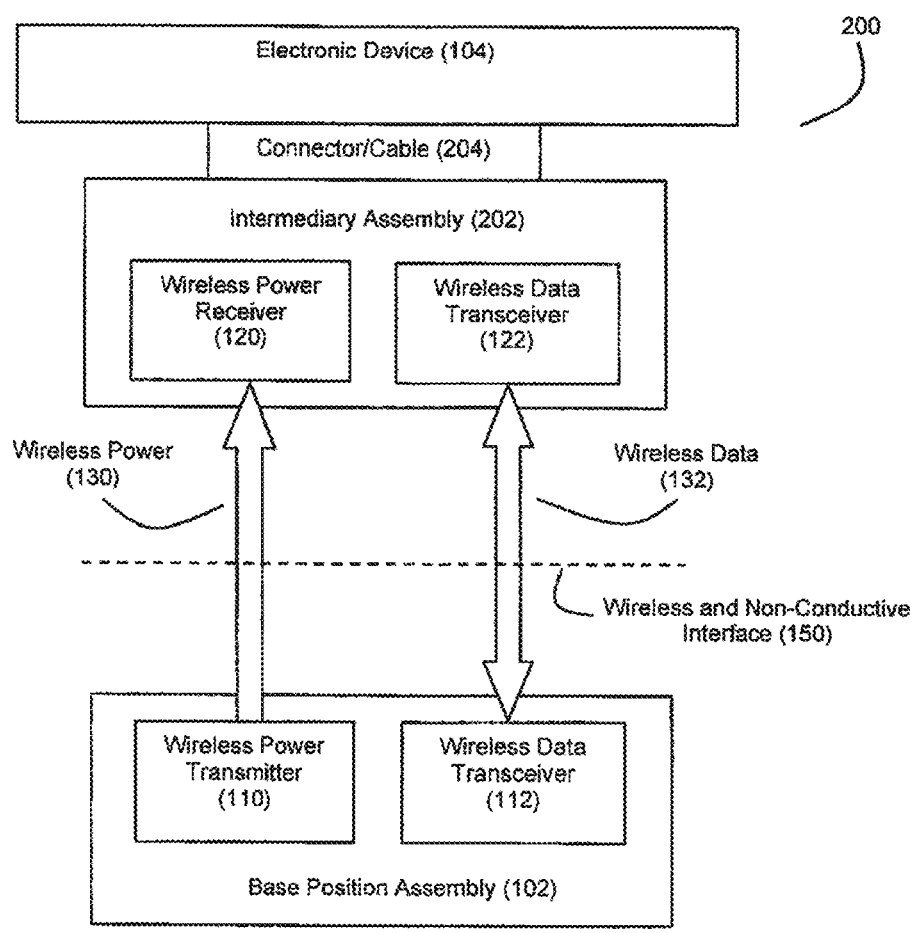
FIG. 2 shows an example system where a wireless and non-conductive interface is employed for indirectly transferring power and data with respect to a base position assembly and electronic device via an intermediary assembly.

FIG. 2 shows an example system 200 where a wireless and non-conductive interface 150 is employed for indirectly transferring power and data with respect to a base position assembly 102 and electronic device 104 via an intermediary assembly 202. In this example, the wireless power receiver 120 and wireless data transceiver 122 are housed within the intermediary assembly 202. A connector and/or cable 204 is then used to transfer power to the electronic device 104 and communicate data between the electronic device 104 and the intermediary assembly 202. An embodiment such as system 200 may be useful in instances where the electronic device does not have native capabilities for receiving wireless power and/or wirelessly sharing information about itself. For example, many smart phones are capable of communicating identifying information and status information about the smart phone via a wired USB connection, and this type of connection (via 204) may be employed to facilitate desired data transfers for system 200.

The intermediary assembly 202 may be similar to the device attachment 106. For example, the intermediary assembly 202 can be a mounting puck or security sensor, such as a flexible adhesive sensor that attaches to the electronic device 104, that can support the electronic device 104 and/or provide security features, such as alarms, in the event of unauthorized removal of the electronic device 104 from the mounting puck or security sensor. Another example of an intermediary assembly 202 can be a case mount as can be used in a docking system for tablet computers. Such a case mount can provide a secure enclosure for a tablet computer and permit docking with a base mount of the docking system. Furthermore, the intermediary assembly 202 may include a wireless node that can be a member of a wireless network such as a wireless mesh network with other devices and allows for wireless data communication with a remote computer system.

Note that systems 100 and 200 as shown by FIGS. 1 and 2 provide techniques for powering and communicating with electronic devices in settings such as retail security displays and docking systems while avoiding the need to connect the electronic device 104 with the base position assembly 102 via an electronic cable or physical connector. By avoiding the need for such wired electrical connectivity, the systems 100 and 200 exhibit greater longevity by avoiding the wear and tear that conventional physical electronic connections are subjected to over time. Also, by avoiding the need for such wired electrical connectivity, the systems 100 and 200 exhibit a sleeker and lighter-weight appearance that avoids the rigidity imposed on the system by cables and physical connections. Thus, systems 100 and 200 can be implemented without a tether connecting the base position assembly 102 and electronic device 104. However, it should be noted that the electronic device 104 may be tethered to the base position assembly 102 via a non-electrical mechanical cable that connects the base position assembly 102 to the device attachment 106 or intermediary assembly 202 to which the electronic device is attached.

A wide range of data can be communicated as wireless data transmission 132 over wireless interface 150. For example, the wireless data transmission 132 can include identifying information about the electronic device 104 (e.g., a make and model for the electronic device, a serial number for the electronic device, a SKU for the electronic device). As another example, the wireless data transmission 132 may include status information about the electronic device 104 (e.g., a charge status for a battery in the electronic device 104, or other operational information for the electronic device 104). As yet another example, the wireless data transmission 132 may include data indicative of user interaction with the electronic device 104 (e.g., data indicative of the existence and/or duration of a lift event for the electronic device 104, data input into the electronic device 104 by a user, etc.). As yet another example, the wireless data transmission 132 can include a command for delivery to the electronic device 104 and/or intermediary assembly 202 (e.g., an arming and/or disarming command for security features, a locking and/or unlocking command for access features, etc.). As yet another example, the wireless data transmission 132 can include software and/or firmware for updating software and/or firmware on the electronic device 104 and/or intermediary assembly 202. As noted above, the base position assembly 102 can include a wireless node that is a member of a wireless network for linking the system 100/200 with a remote computer system from which the system 100/200 can be remotely monitored and/or controlled.

Figure 3A:
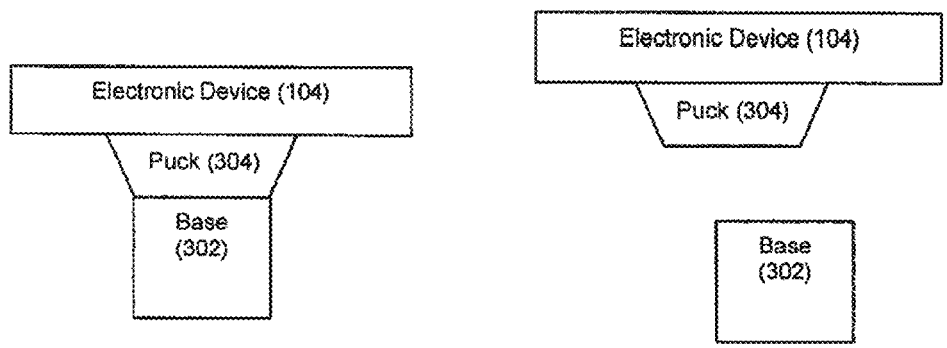
FIGS. 3A-3D show examples of retail security positions that can be employed to implement systems shown in FIGS. 1 and 2.

FIG. 3A shows an example retail security position that can be employed to implement system 100 of FIG. 1, The retail security position can take the form of a base 302 and puck 304. With reference to FIG. 1, the base 302 can be the base position assembly 102 and the puck 304 can be the device attachment 106.

Figure 3B:
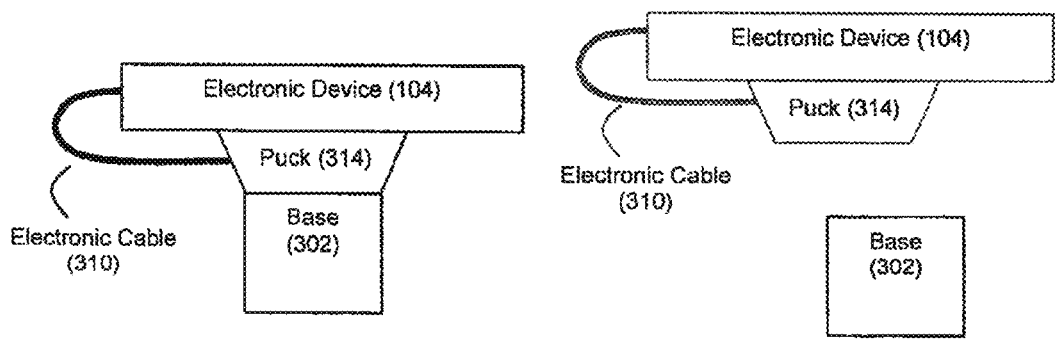

With the example of FIG. 3A, the electronic device 104 and attached puck 304 can be rested on base 302. While in such a rest position, the system can support the wireless transfer of wireless power transmission 130 and the wireless transfer of wireless data transmission 132 as discussed above. When the electronic device 104 and attached puck 304 are lifted, or separated, from the base 302 as shown in FIG. 3A, the wireless power link is broken. The wireless data link is also be broken when the device 104 is moved out of range of the respective wireless data transceivers 112 and 122 in the base 302 and device 104. FIG. 3B shows an example retail security position that can be employed to implement system 200 of FIG. 2. With reference to FIG. 2, the base 302 is the base position assembly 102, the puck 304 is the intermediary assembly 202, and the electronic cable 310 is connector/cable 204.

With the example of FIG. 3B, the puck 314 and the base 302 are similar to the puck 304 and the base 302 described above with reference to FIG. 3A, but there is an electronic cable 310 that attaches the puck 314 to the electronic device 104. Accordingly, in this example, there can be a wired power and/or data connection between the puck 314 and electronic device 104 as described in FIG. 2 with the puck 314 implemented in the same manner as the intermediary assembly 202. With FIG. 3B, like FIG. 3A, the electronic device 104 and attached puck 314 can be rested on base 302. While in such a rest position, the system can support the wireless transfer of wireless power transmission 130 and the wireless transfer of wireless data transmission 132 as discussed above. When the electronic device 104 and attached puck 314 are lifted, or separated, from the base 302 as shown in FIG. 3B, the wireless power link is broken. The wireless data link the wireless data transceivers 112 and 122 is broken when the puck 314 is separated from the base 302.

Figure 3C:
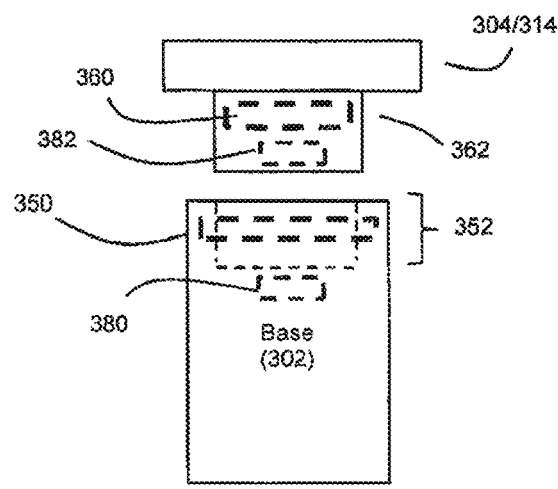
Figure 3D:
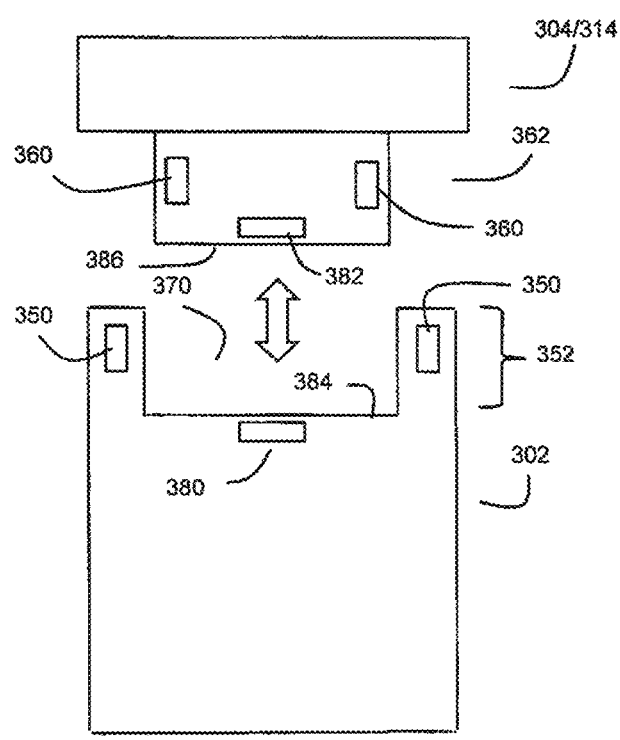

FIGS. 3C and 3D show an example of one or more inductive transmit coils 350 positioned in the base 302 and one or more inductive receive coils 360 positioned in the puck 304/314 to support wireless power transmission from the base 302 to the puck 304/314. FIG. 3C shows a side-elevation view of a base 302 which has an inductive transmit coil 350 located concentrically inside a periphery of a rim 352 on the base 302. Rim 352 defines a recess 370 (see FIG. 3D) in which a lower portion 362 of the puck 304/314 fits when the puck 304/314 is rested on the base 302. An inductive receive coil 360 can be positioned in the puck 304's/314's lower portion 362 so that coil 360 is near the periphery of lower portion 362 and will be concentrically within and adjacent coil 350 when the puck 304:314 is resting on the base 302, FIG. 3D shows a central cross-sectional view of the base 302 and puck 304/314, where this cross-sectional view clearly shows the recess 370 formed by rim 352.

FIGS. 3C and 3D show an example where the base 302 includes a wireless data transceiver 380 positioned near a lower surface 384 of the recess 370, and the puck 304/314 includes a wireless data transceiver 382 positioned near the bottom surface 386 of the lower portion 362. When the puck 304/314 is resting on the base 302, the lower portion 362 of the puck 304/314 is inserted into the recess 370 of the base 302. As a result, the transceivers 380 and 382 are sufficiently proximate for wireless data transmission between the base 302 and puck 304/314.

Note that the base 302 and/or puck 304 of FIGS. 3A-3D may include wireless nodes that are members of a wireless network so that the retail security position has connectivity with a wirelessly connected environment for remote monitoring and control by a remote computer system.

Figure 4:
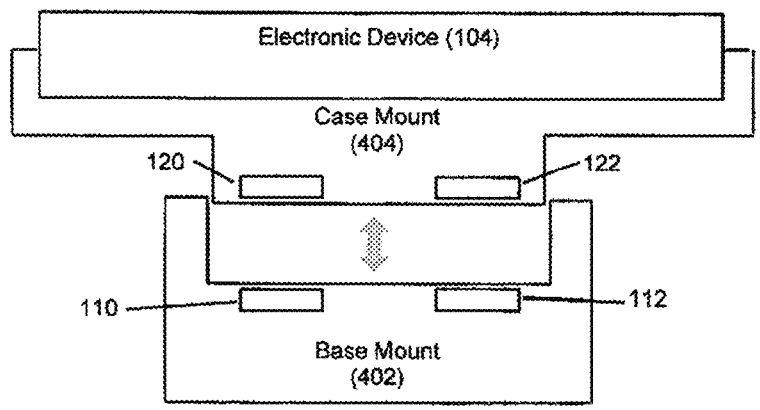
FIG. 4 shows an example docking system that can be employed to implement the systems shown in FIGS. 1 and 2.

FIG. 4 shows an example docking system implemented with the embodiments show in FIGS. 1 and/or 2. The docking system includes a base mount 402 and case mount 404. However, due to the wireless power transfer capabilities of systems 100/200, the contact arrangements between the base mounts and case mounts may be omitted. With reference to FIGS. 1 and 2, the base mount 402 may be a base position assembly 102, and the case mount 404 may be a device attachment 106 and/or intermediary assembly 202.

With the example of FIG. 4, the electronic device 104 and attached case mount 404 can be docked with the base mount 404. While in the docking position, the docking system supports wireless transfer of wireless power transmission 130 and the wireless transfer of wireless data transmission 132 as discussed above. When the electronic device 104 and attached case mount 404 are undocked from the base mount 402, the wireless power link is broken. The wireless data link is broken when the device 104 is moved out of range of the respective wireless data transceivers 112 and 122 in the base mount 402 and case mount 404 or device 104. As an example, the base mount 402 may include the wireless power transmitter 110 and the wireless data transceiver 112 at locations near a surface of the recess in which the case mount 404 is received. The case mount 404 may include the wireless power receiver 120 and the wireless data transceiver 122 located near a surface of the case mount 404 so that such that when the case mount 404 is docked with the base mount 402 the wireless power transmitter 110 and the wireless data transceiver 112 close enough to the wireless power receiver 120 and the wireless data transceiver 122 for wireless power and data transfer to occur.

Also, it should be understood that the base mount 402 and case mount 404 of FIG. 4 may include wireless nodes that are members of a wireless network so that the docking system has connectivity with a wirelessly connected environment for remote monitoring and control by a remote computer system.

Figure 5:
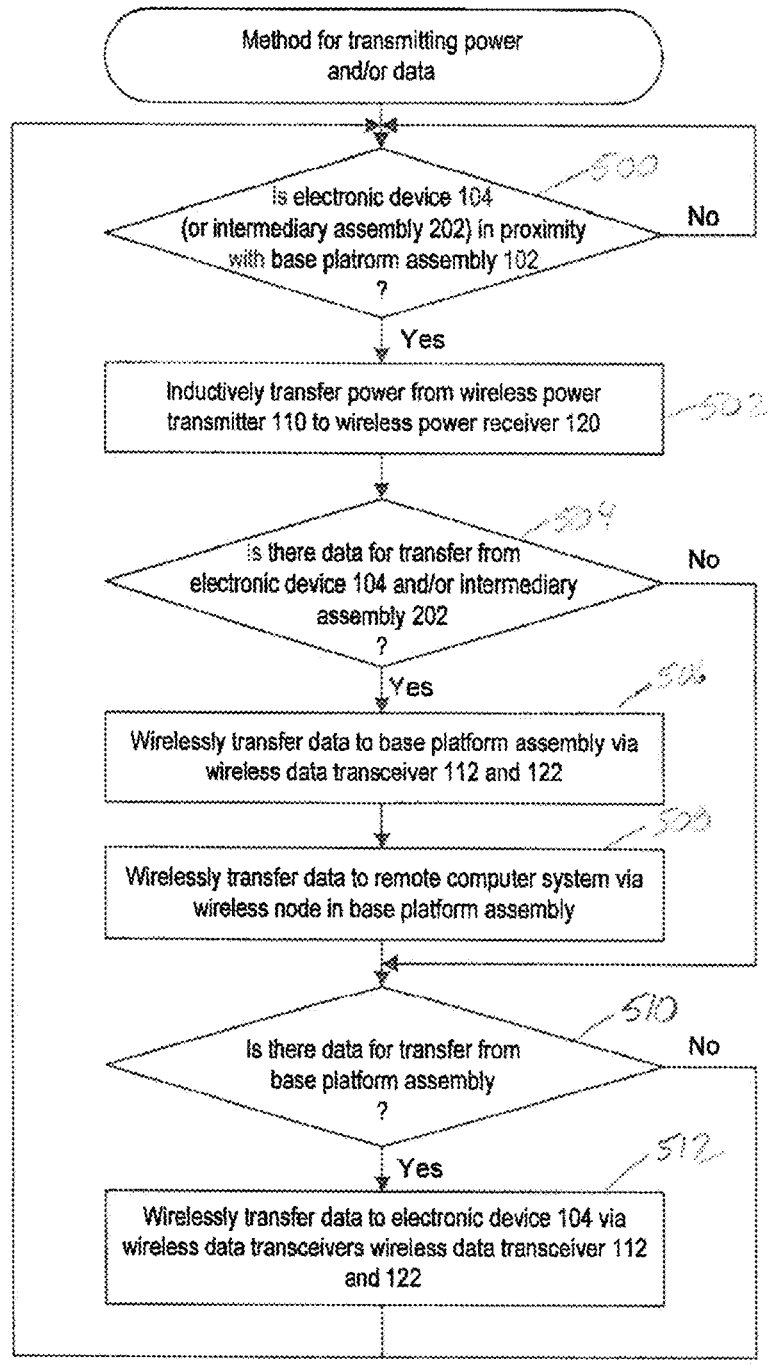
FIG. 5 is a flow diagram.

FIG. 5 depicts an example process flow for the operations of the embodiments of FIGS. 1 and/or 2. As step 500, when the electronic device 104 is in proximity with the base position assembly 102, the wireless power and data transfer is enabled. In other words, the electronic device 104 is in proximity of the base position assembly 102 when the wireless power receiver 120 is located within the magnetic field created by the wireless power transmitter and/or the wireless data transceiver 122 is able to transmit data to and receive data from the wireless data transceiver 112 as shown in FIG. 1. Alternatively, the electronic device 104 is in proximity of the base position assembly 102 when the wireless power receiver 120 is located within the magnetic field created by the wireless power transmitter and/or the wireless data transceiver 122 is able to transmit data to and receive data from the wireless data transceiver 112 as shown in FIG. 2. Alternatively, the electronic device 104 is in proximity of the base position assembly 102 when the wireless power receiver 120 is located within the magnetic field created by the wireless power transmitter and/or the wireless data transceiver 122 is able to transmit data to and receive data from the wireless data transceiver 112 as shown in FIGS. 3 and 4.

At step 502, wireless power is transferred from the wireless power transmitter 110 in the base position assembly 102 to the nearby wireless power receiver 120 in the electronic device 104 (see FIG. 1) or in the intermediary assembly 202 (see FIG. 2). Implementations may include the wireless power transmitter 110 (and/or wireless power receiver 120) controls when the charging turns on and off and the amount of power transferred via the wireless power signal.

If step 504 results in a determination that there is data to be transferred from the electronic device 104 and/or intermediary assembly 202 over wireless interface 150, control flows to step 506. At step 506, wireless data transmission 132 is wirelessly transferred from the wireless data transceiver 122 in the electronic device 104 or intermediary assembly 202 as applicable to the wireless data transceiver 112 in the base position assembly 202. At step 508, the base position assembly 202 can wirelessly relay such data to a remote computer system via a wireless network.

If step 510 results in a determination that there is data to be transferred from the base position assembly 102 over wireless interface 150, control flows to step 512. The data can be data that the base position assembly 202 may receive from a remote computer system (such as a remote command, a software/firmware update, etc.) via a wireless network. At step 512, wireless data transmission 132 is wirelessly transferred from the wireless data transceiver 112 in the base position assembly 202 to the wireless data transceiver 122 in the electronic device 104 or intermediary assembly 202 as applicable.

The wireless power transmitter 110 may be operated to generate a magnetic field with a frequency of oscillation that does not overlap or interfere with the frequency, or frequency range, of the EHF near field of the wireless data transceivers 112 and 122. By utilizing different transmission frequencies and/or frequency ranges to operate the wireless power transmitter 110 and the wireless data transceivers 112 and 122 interference between the wireless power transmission 130 and wireless data transmission 132 is greatly reduced or nonexistent.

Wireless power transfer techniques and wireless data transfer techniques may be complementary with respect to each other when combined together in a close proximity as described above. For example, specific combinations of wireless power and wireless data can be used to increase isolation and reduce any interference between the wireless power 130 and wireless data 132. For example, inductive coupling-based wireless power transmission techniques that use inductive coupling as the transmission medium with non-overlapping radiative wireless data techniques. This combination not only utilizes different transmission mediums (inductive vs RF radiative), but the operating frequencies for the wireless power 130 and wireless data 132 are sufficiently far apart that potential interference is greatly reduced. For example, the inductive power charging can operate in a frequency range of approximately 50 kHz to approximately 1000 kHz, while EHF near field wireless data transfer may operate in a frequency range of approximately 30 GHz to approximately 300 GHz (e.g., 60 GHz). The inductive coupling typically utilizes a relatively large area for the coil, and the EHF near field communication can be implemented in a sufficiently low emission power implementation to require an almost touching operational distance and a very small (and alignment sensitive) transmissive location requirement for both ends of the data transceivers. As a result, both wireless mediums are physically non-interfering and non-RF interfering. Another advantage is that signals used to perform wireless data transmission tend to propagate through typical plastics, such as ABS. As a result, plastic lenses may be used to direct and focus the signal which can increase the distance of transmission, as described below.

Figure 6A:
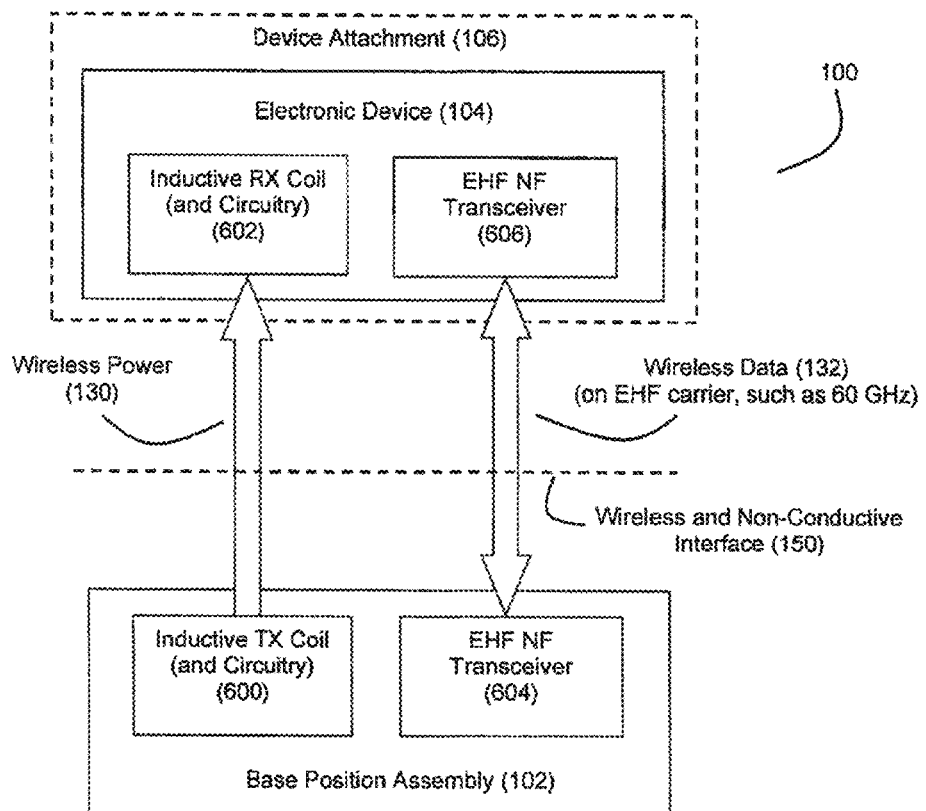
FIGS. 6A and 6B show example systems that combine inductive coupling for wireless power transmission with wireless data transmission.
Figure 6B:
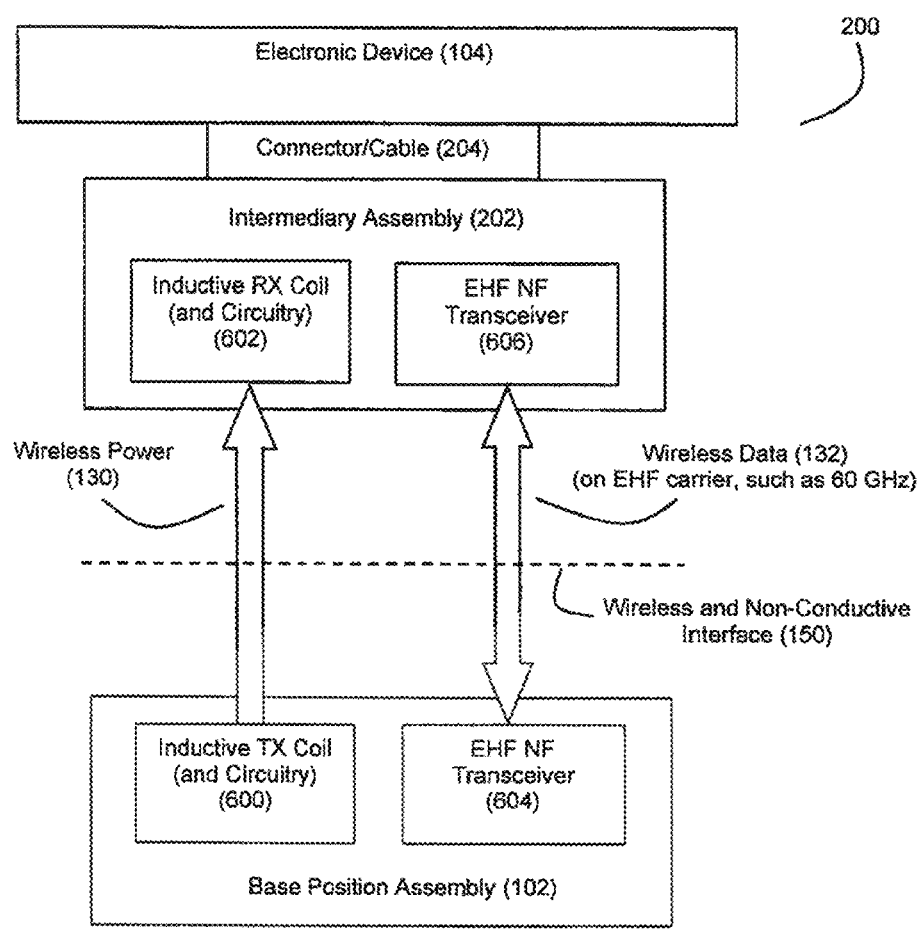

FIGS. 6A and 6B show example systems 100 and 200 respectively, where the wireless power transfer employs inductive RF coils 600 and 602 as wireless power transmitter 110 and wireless power receiver 120 respectively and where the wireless data transfer employs EHF near field wireless data transceivers 604 and 606 as wireless data transceivers 112 and 122 respectively. The size for the inductive charging coils can vary. As examples, the coil size may exhibit a diameter in the range of approximately 1.5 to 3 inches. The inductive RF coils can operate at frequencies such as those in a range between 50 kHz to 1000 kHz. For example, inductive charging can operate at about 100 kHz, and the EHF near field wireless data transceivers can operate at a frequency or about 30 GHz or more (e.g., 60 GHz). By utilizing different transmission mediums (inductive vs RF radiative), and operating at non-overlapping frequencies, the potential for interference between the wireless power transmission 130 and wireless data transmission 132 is greatly reduced or nonexistent.

Any of a number of techniques can be used to achieve alignment between the wireless power components 110/120 and wireless data components 112/122 for systems 100/200 when the electronic device 104 is resting on the base position assembly 102.

Figure 7A:
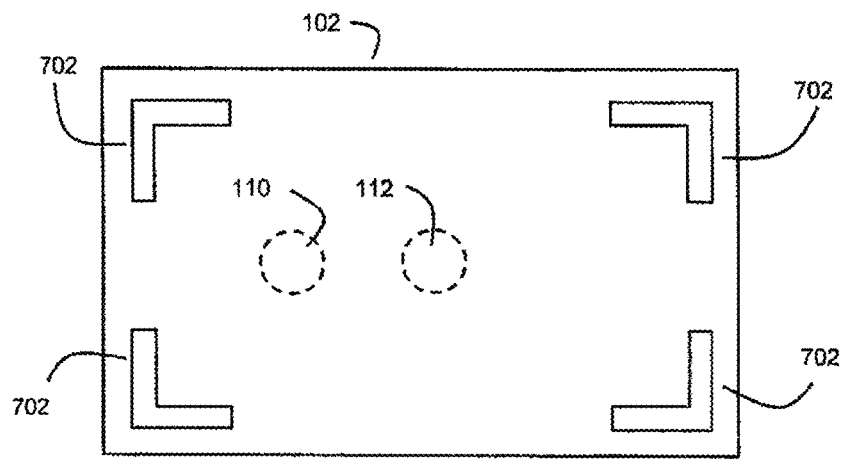
FIGS. 7A-C show examples of techniques that can be used for aligning the wireless power and data components of the systems shown in FIGS. 1, 2, 3A-3D, 6A and 6B.
Figure 7B:
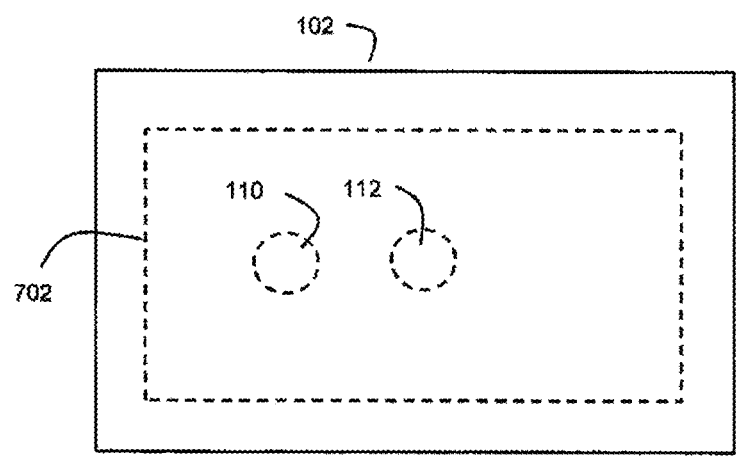

For example, in an example embodiment, visual indicators can be placed on the base position assembly 102 to identify how the electronic device 104 (or intermediary assembly 202) should be positioned thereon to achieve alignment between the wireless power components 110/120 and wireless data components 112:122 when the electronic device 104 is resting on the base position assembly 102. For example, as shown by FIGS. 7A and 7B, an outline for device 104 can be visually indicated on a surface of the base position assembly 102 to show where the device 104 should be placed on base position assembly surface to achieve alignment of the wireless power components 110/120 and wireless data components 112/122. FIGS. 7A and 7B show a top view of an example base position assembly 102 where visual indicators 702 show how an electronic device 104 (or intermediary assembly 202) can be positioned on the base position assembly 102 to achieve an alignment between the wireless power and data components. The locations of the wireless power transmitter 110 and wireless data transceiver 112 on the base position assembly 102 are shown, and such an example can leverage a known spatial relationship between the boundaries of the electronic device 104 (or intermediary assembly 202) and the locations of the wireless power receiver 112 and wireless data transceiver 122 within the electronic device 104 (or intermediary assembly 202) to achieve alignment when positioned in accordance with the visual indicators 702. The visual indicators 702 in the example of FIG. 7A are the dimensional corners of the electronic device 102 (or intermediary assembly 202). The visual indicator 702 in the example of FIG. 7B is the overall outline of the electronic device 102 (or intermediary assembly 202).

As another example embodiment, the base position assembly 102 can be designed to include a sufficiently large number of wireless power transmitters 110 (e.g., multiple inductive coils) so that the likelihood of one of the coils aligning with the complementary coil(s) in the device 104 or intermediary assembly 202 when the device 104 or intermediary assembly 202 is placed on the base position assembly 102 increases. Similarly, the base position assembly 102 can be designed to include a sufficiently large number of wireless data transmitters 112 so that the likelihood of one aligning with a complementary wireless data transceiver 122 in the device 104 or intermediary assembly 202 when the device 104 or intermediary assembly 202 is placed on the base position assembly 102 increases. Similarly, multiple wireless power receivers 112 and/or wireless data transceivers 122 can be included in the device 104 or intermediary assembly 202 to increase the chances of alignment.

As another example embodiment, the base position assembly 102 can include physical features that force a physical alignment with the device 104 and/or intermediary assembly 202 with the base position assembly 102. For example, a recess can be included on a surface of the base position assembly 102 where the wireless power components 110/120 and wireless data components 112/122 are located. This recess can be sized to fit the device 104 (which may include device attachment 106) and/or intermediary assembly 202 (and device 104) so that when the device 104 is placed in the recess an alignment between the wireless power components 110/120 and wireless data components 112/122 is achieved. For example, with reference to FIGS. 7A and 7B, the visual indicators 702 could be replaced within a recess that is sized to fit the outline of the electronic device 104 (or intermediary assembly 202). As another example, the base position assembly 102 can include raised portions that are designed to force or encourage an alignment between the wireless power components 110/120 and wireless data components 112/122 when the device 104 (which may include device attachment 106) and/or intermediary assembly 202 (and device 104) is placed on the base position assembly 102. For example, one or more corner pieces could raise from the surface of the base position assembly 102 to force or encourage a specific placement of the device 104 or intermediary assembly 202 relative to the base position assembly's wireless power transmitter 110 and wireless data transceiver 120. For example, with reference to FIGS. 7A and 7B, the visual indicators 702 could be replaced with corresponding raised elements.

Figure 7C:
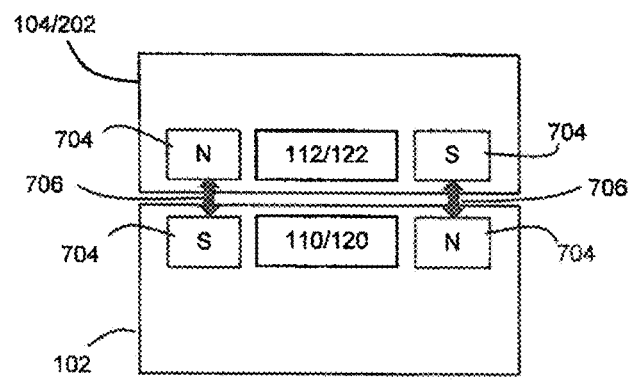

As yet another example embodiment, magnets can be included in the base position assembly 102 that can interact with metallic elements or complementary magnets in the device 104 or intermediary assembly 202 to create attractive forces that drive an alignment between the wireless power components 110/120 and wireless data components 112/122 when the device 104 (which may include device attachment 106) and/or intermediary assembly 202 (and device 104) is placed on the base position assembly 102. FIG. 7C shows an example where complementary magnets 704 are located in the base position assembly 102 and electronic device 104 (or intermediary assembly 202) that force an alignment between the wireless power and/or data components 110/120 in the base position assembly 102 and the wireless power and/or data components 112/122 in the electronic device 104 (or intermediary assembly 202) via magnetic attraction 706.

Furthermore, to increase the permitted distance between the EHF near field wireless data transceivers 604 and 606 for communicating with each other, lens and/or conduits that are conducive to RF signal propagation (e.g., plastic lenses and/or plastic conduits) can be employed to extend the propagation distance of the EHF carrier signals and expand distance or other positioning options between the base position assembly 102 and/or electronic device 104 (or intermediary assembly 202).

Figure 8A:
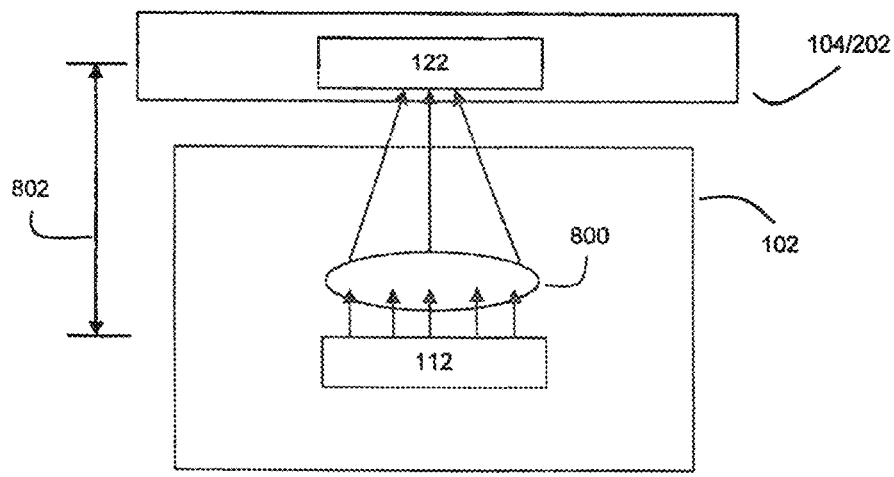
FIG. 8A shows an example lens is used to focus a wireless data signal and extend communication range between two wireless data transceivers.

FIG. 8A shows an example of a lens 800 used to extend the distance of the EHF carrier signal away from a surface of the base position assembly. In the example of FIG. 8A, lens 800 is formed from a material (e.g., a plastic) that is conducive to the propagation of RF signals (e.g., more conductive than propagation over free space air), and, in this example, is positioned in the base position assembly 102 to focus the wireless data signal output from the wireless data transceiver 112 to the wireless data transceiver (e.g. 112) located away from the base position assembly. In this example, lens 800 can extend the distance 802 between corresponding wireless data transceivers 112/120. Lens 800 can also be shaped to provide focusing, spreading, and/or directional steering effects for targeting the wireless data signal 132 in a particular direction. Lens 800 can exhibit any of a number of shapes depending on the RF signal disbursement characteristics, such as a plano-convex lens, a convex-convex lens, a plano-concave lens, a concave-concave lens, or a concave-convex lens. The lens 800 may be formed from a contoured surface of the base position assembly 102 or may be formed from contoured opposing surfaces (i.e., lenses) of the base position assembly 102 and the intermediate assembly 202 when the base position assembly 102 and the intermediate assembly 202 are in proximity to one another.

Figure 8B:
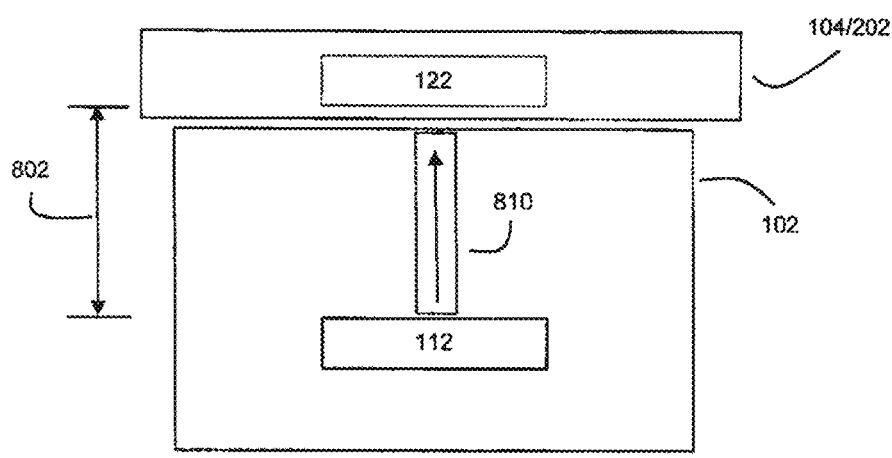
FIG. 8B shows an example conduit is used to propagate a wireless data signal and extend communication range between two wireless data transceivers.

FIG. 8B shows an example of a conduit 810 that can be used for the purpose of expanding distance or other positioning options as between the base position assembly 102 and/or electronic device 104 (or intermediary assembly 202). In the example of FIG. 8B, conduit 810 is formed from a material (e.g., a plastic) that conducts the propagation of RF signals (e.g., more conductive than propagation over free space air). While the example of FIG. 8B shows a conduit 810 that exhibits a straight shape, it should be understood that the conduit 810 could exhibit more complex shapes to directionally steer the RF signal to a desired destination. In addition, the conduit 810 may be composed of a solid material or it may be a hollow material with an aperture extending along its central axis. Further still, the conduit 810 may be formed from a flexible material that allows the conduit to be bent or otherwise adjusted to permit flexible re-positioning of the electronic device 104 (or intermediary assembly 202) relative to the base position assembly 102 (e.g., see FIG. 11 discussed below).

While FIGS. 8A and 8B show the lens 800 and conduit 810 being located in the base position assembly 102, note that in other implementations a lens 800 and/or conduit 810 could also be located in the electronic device 104 (or intermediary assembly 202).

Figure 9A:
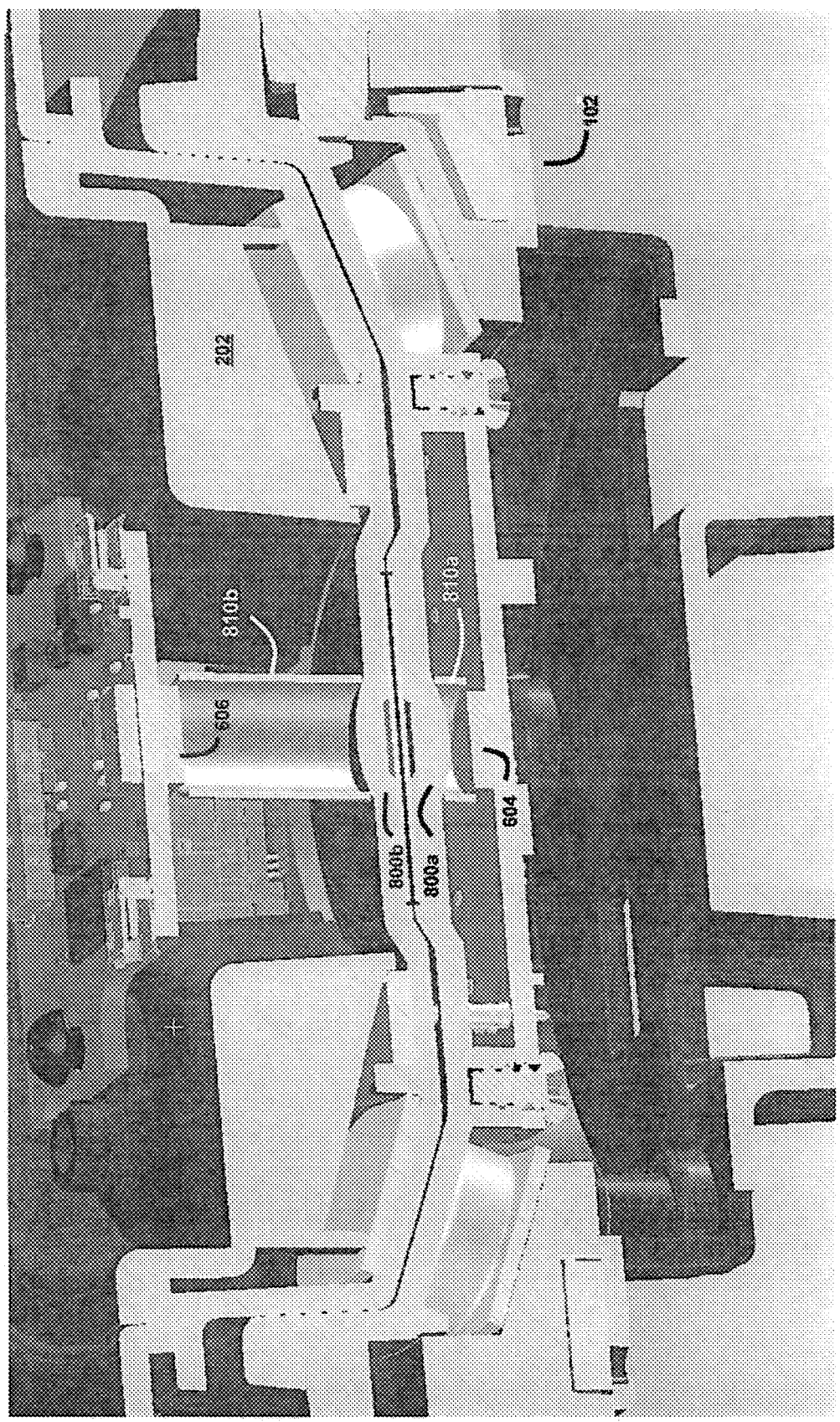
FIGS. 9A-9D show example views for an embodiment where conduits and lenses are used to facilitate propagation of wireless signals.
Figure 9B:
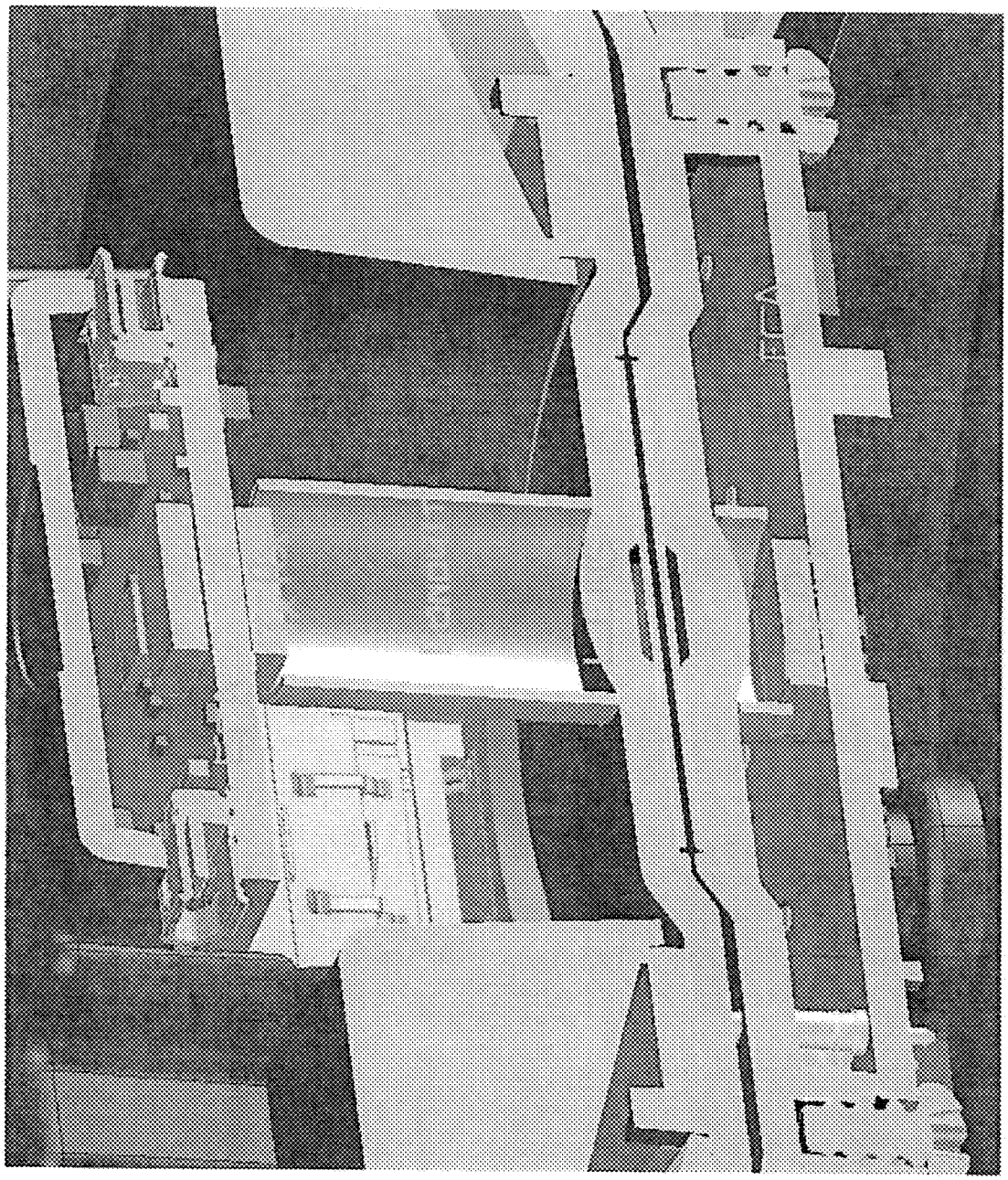
Figure 9C:
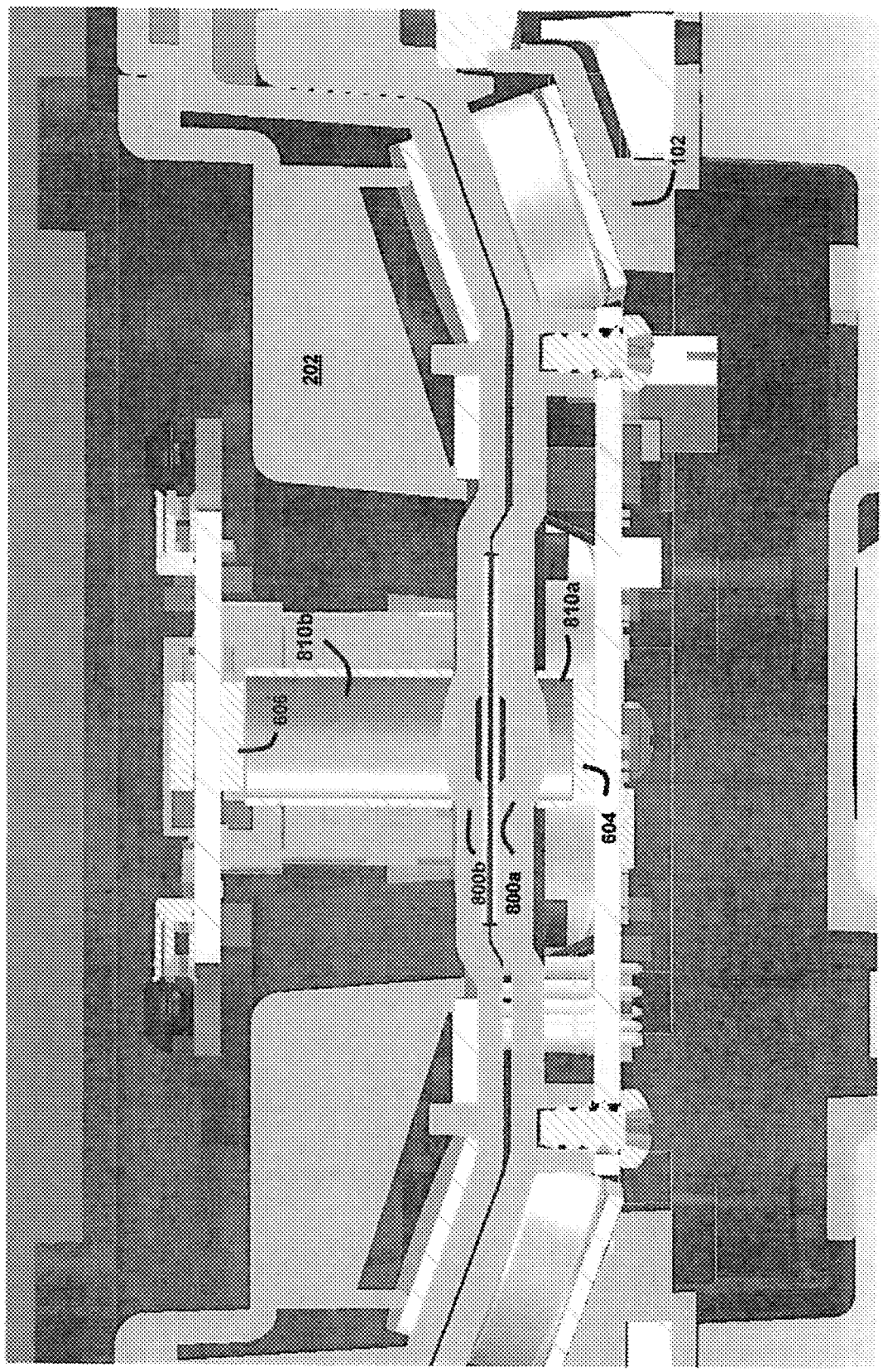

FIG. 9A shows an example cross-sectional oblique view of a base platform assembly 102 and intermediary assembly 202 with a lens 800 and conduits 810 used to extend the wireless data range as between transceivers 604 and 606. The lens 800 is formed from a plano-convex lens 800a in the base platform assembly 102 and a plano-convex lens 800b in intermediary assembly 202 The conduit 810 comprises a conduit 810a in the base platform assembly 102 and a conduit 810b in intermediary assembly 202. FIG. 9B shows another perspective view of the system shown by FIG. 9A; and FIG. 9C shows an orthogonal view of the system shown by FIG. 9A. In this example, the plano-convex lens 800a and plano-convex lens 800b are located adjacent to one another to form a biconvex lens. In this example, the conduits 810a/810b can be hollow tubes whose inner surface along the central aperture is made of or treated with an RF reflective material that promotes the transmission of an RF signal from one conduit to the other conduit via the lens 810a/810b. The length and diameter of the conduits 810a/810b can be varied depending on data transmission requirements. In the example of FIG. 9A, conduit 810b is approximately 19 mm long and 4.5 mm in diameter. Conduit 810a may be omitted by a practitioner if the base position assembly 102 permits sufficiently close proximity between the wireless data transceiver 604 and base surface. Also, it should be understood that the cross-sectional geometry of the conduit 810 is not limited to just circular. The propagation characteristics of the RF signal can be altered by various geometric constructs of the conduit 810. Examples of such geometric constructs may include but are not limited to (1) conduits with a tapered/conical shape, (2) conduits with a non-linear continuous shape (e.g., parabolic shape), (3) conduits with cross-sections of round, faceted, oval, elliptical, or rounded rectangular sections, and (4) conduits with any combination of linear transition and various cross-sections.

Figure 10:
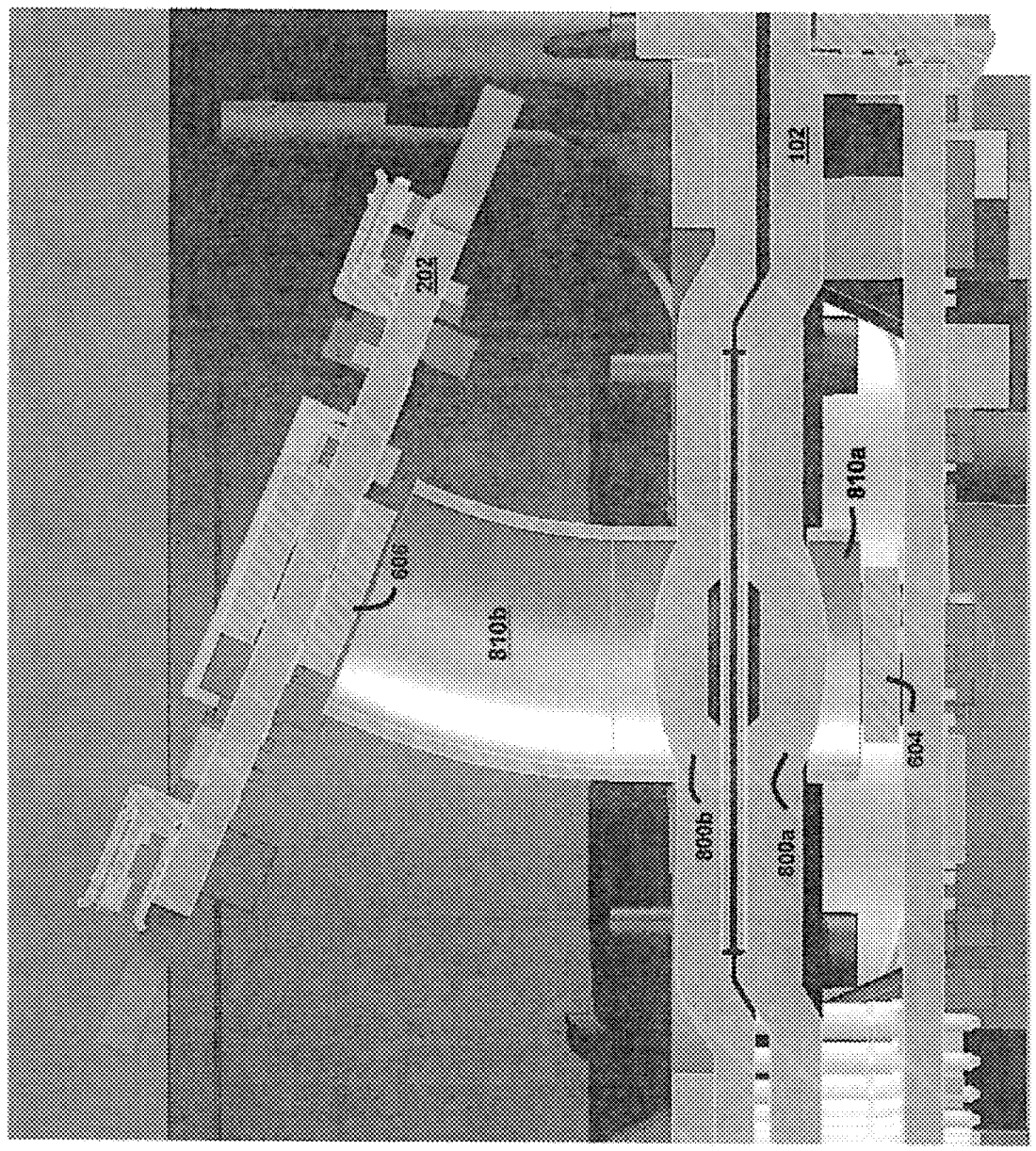
FIG. 10 shows an example curved conduit.

Arced, curvilinear, or serpentine shapes for the conduit 810 may also be constructed to satisfy transmission from one location to another over longer distances. Such conduits 810 may also incorporate one or more cross section shapes and various sizes of cross sections in such a way to alter the RF transmission. For example, FIG. 10 shows a cross-sectional view of an example system that includes a curved conduit 810b to promote the transmission of RF signals between 604 and 606 while allowing an electronic device to be oriented in a manner desired for ease of use by a user. As another example, FIG. 11 shows a cross-sectional view of an example system that includes a flexible conduit 810b that provides a serpentine or arbitrary path for data transmission. FIG. 11 shows a continuous path of arbitrary length may be used between the base position assembly 102 and the electronic device and/or intermediary assembly 202 to afford a transmission path. An example embodiment of this arrangement is for the conduit 810 to be perpendicular to its connected devices (e.g., base position assembly 102, intermediary assembly 202, and/or electronic device 104) at each end; however some latitude can be permitted for angular intersection that may or may not adversely affect the integrity of the data transmission.

Figure 9D:
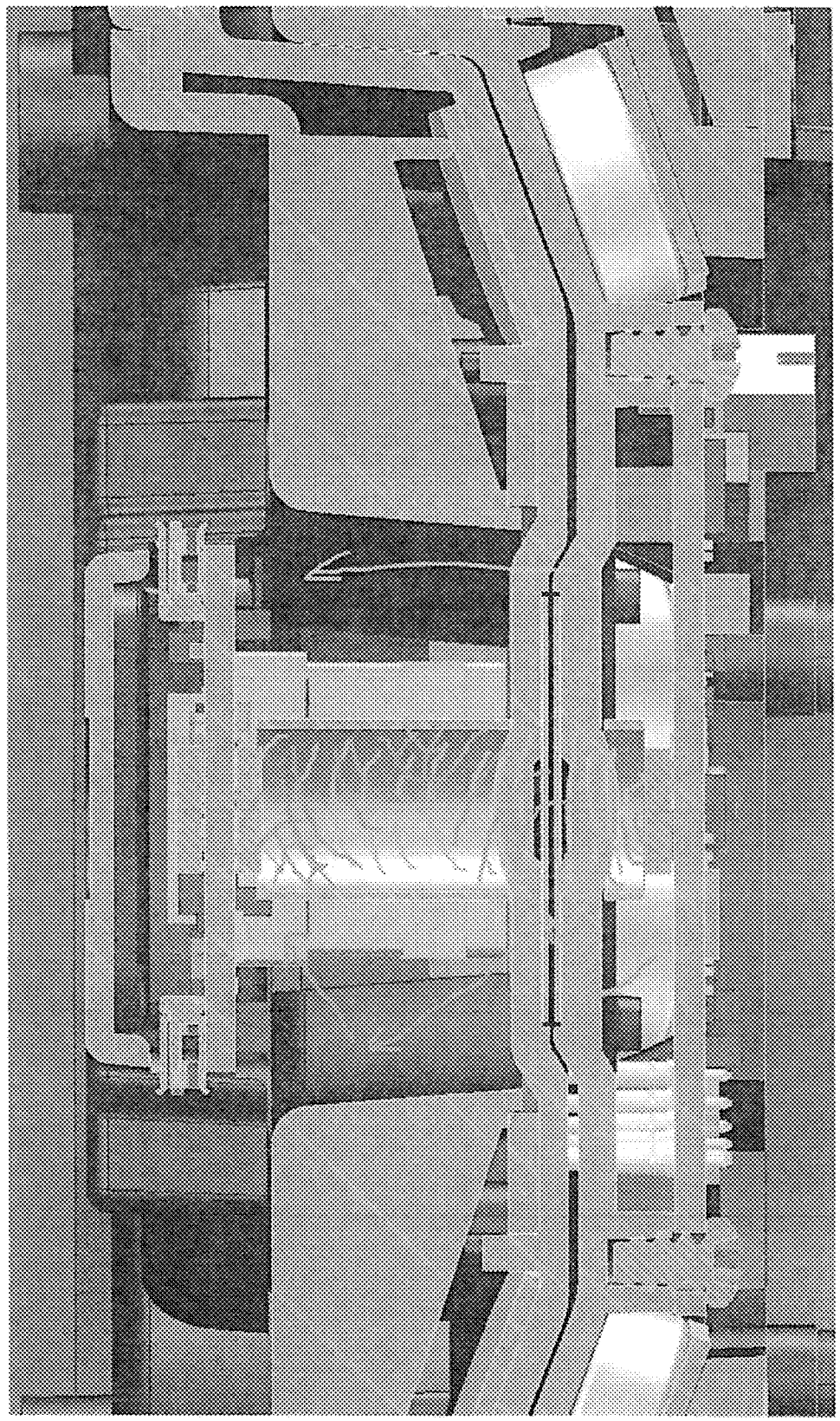

FIGS. 9A-9C also show that the system includes a lens in each of the base position assembly 102 and the intermediary assembly 202. In this example, the lenses 800a and 800b are plano-convex lenses and are positioned and shaped to combine together as an effectively convex-convex lens (i.e., biconvex lens). As shown in FIGS. 9A-10, lenses 800a and 800b are contoured surfaces of the base position assembly 102 and the intermediate assembly 202, respectively. In other implementations, the plano-convex lens 800b may be omitted leaving only the plano-convex lens 800a so that the RF signal emitted from the wireless data transceiver 604 spreads out as the RF signal enters the conduit 810b and the RF signal emitted from the wireless data transceiver 606 is focused onto the wireless data transceiver 604. In other implementations, the plano-convex lens 800a may be omitted leaving only the plano-convex lens 800b so that the RF signal emitted from the wireless data transceiver 606 spreads out as the RF signal enters the conduit 810a and the RF signal emitted from the wireless data transceiver 604 is focused onto the wireless data transceiver 606. In still other implementations, a lens between the wireless data transceivers 604 and 606 may be formed from any combination of plano-convex lenses and plano-concave lenses. For example, the plano-convex lens 800b may be replaced by a plano-concave lens that spreads to RF signal entering the conduit 810b. FIG. 9D shows how the lenses 800a and 800b can interact in combination with the conduits 810a and 810b to propagate RF signals along both straight paths and reflective paths where the signals bounce of the internal reflective surface of conduits 810a and 810b.

Figure 12A:
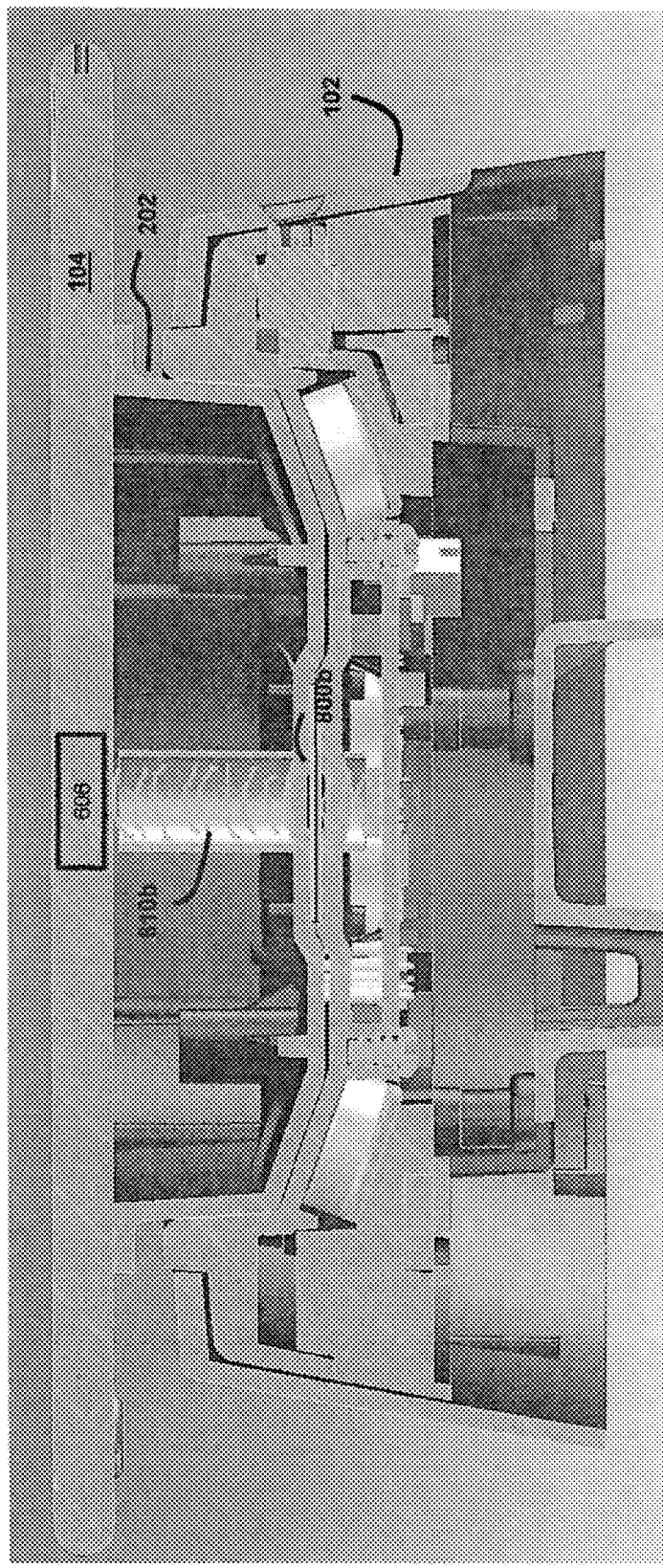
FIGS. 12A-C show example implementation with conduits and lenses to facilitate propagation of wireless signals.
Figure 12B:
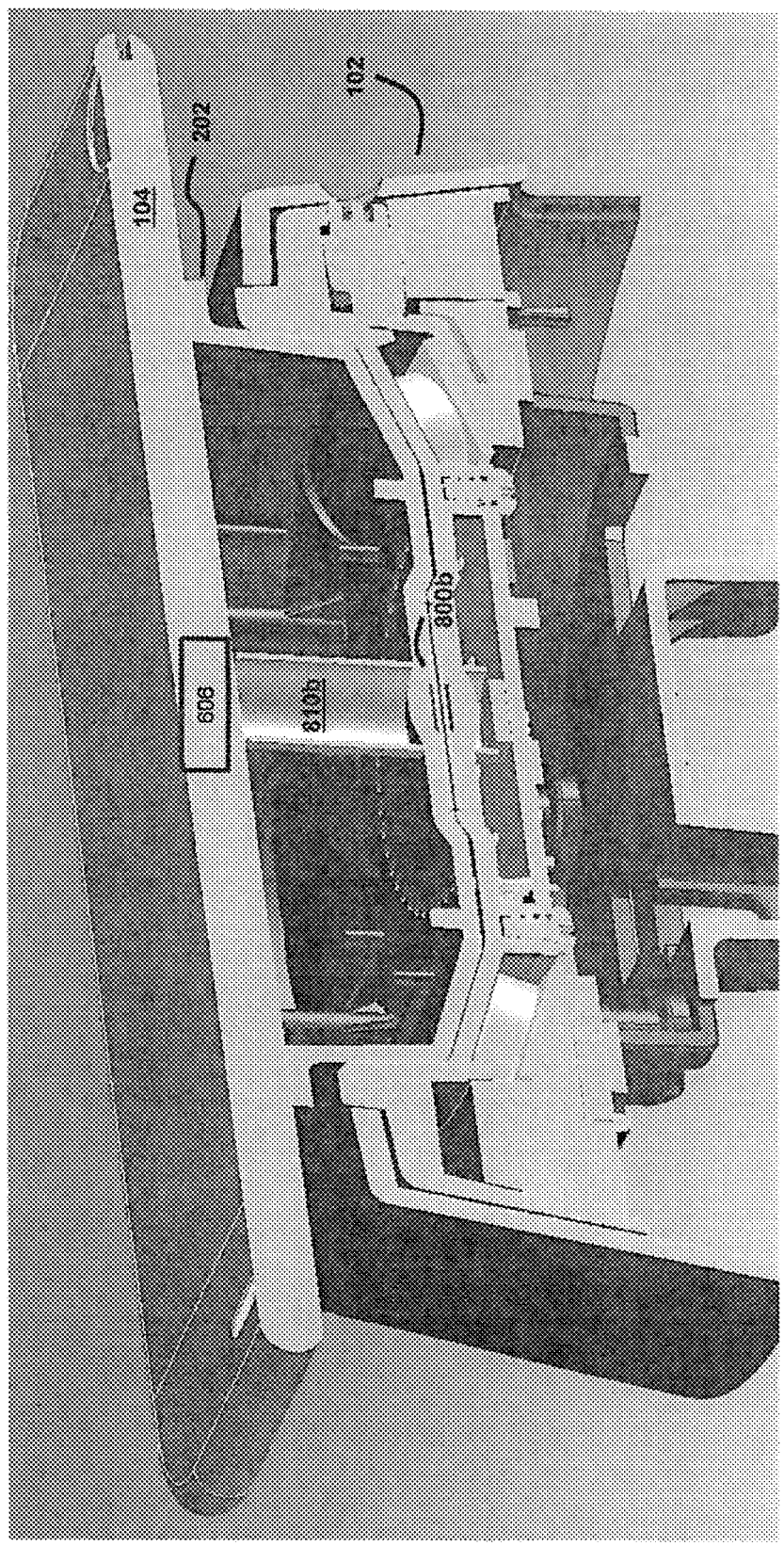
Figure 12C:
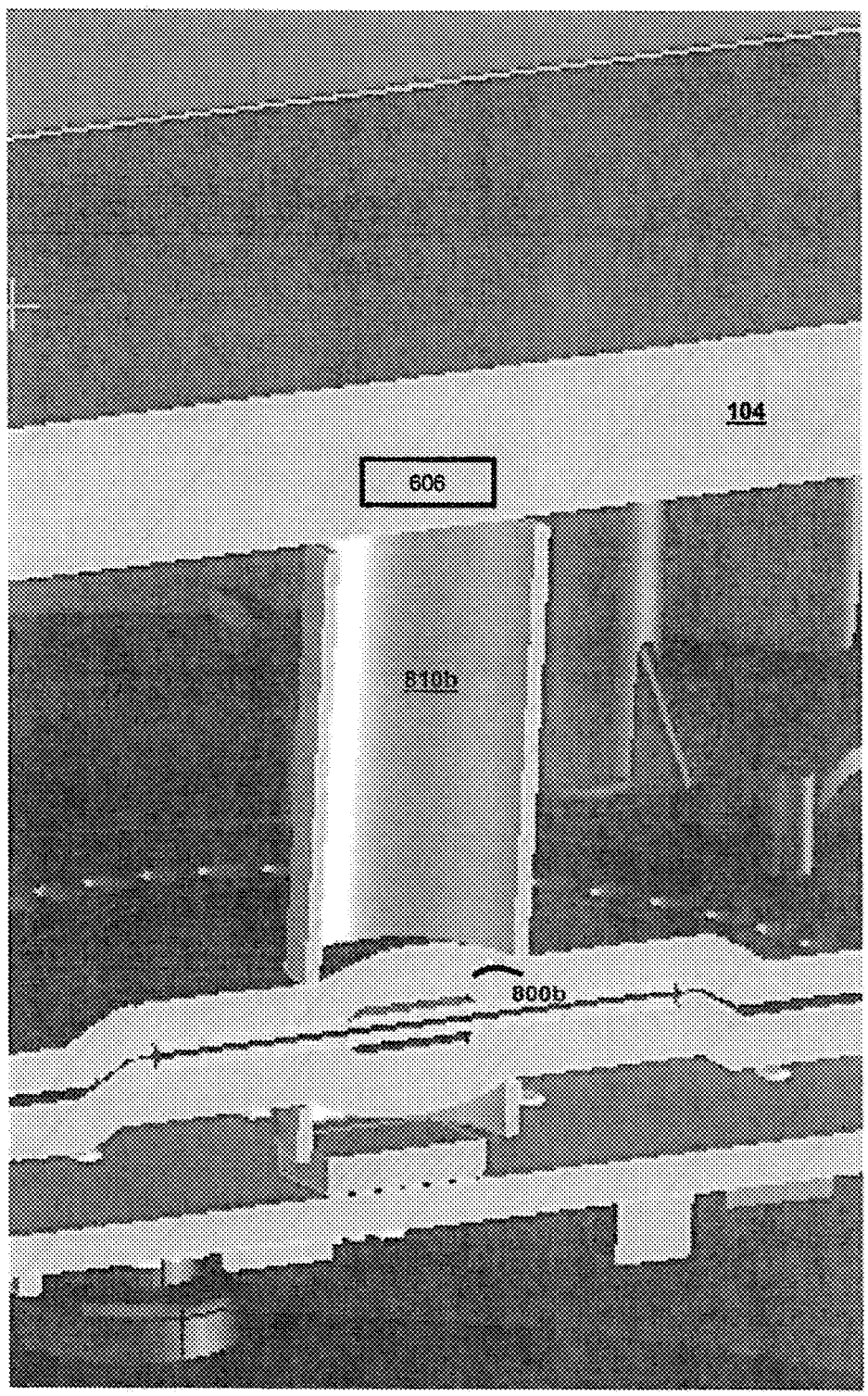

FIGS. 12A-C show examples where lenses 800 and conduits 810 are used in connection with a direct link with a wireless data transceiver 606 located in the electronic device 104. In these examples, the lens 800b and conduit 810b in the intermediary assembly 202 (such as a puck for a retail security position) propagate the RF signals to a wireless data transceiver 606 located inside the electronic device 104 (rather than to a wireless data transceiver 606 located inside the intermediary assembly 202). Such an arrangement can permit direct data communications between the base position assembly 102 and the electronic device 104 without passing through processing circuitry in the intermediary assembly 202.

Figure 13A:
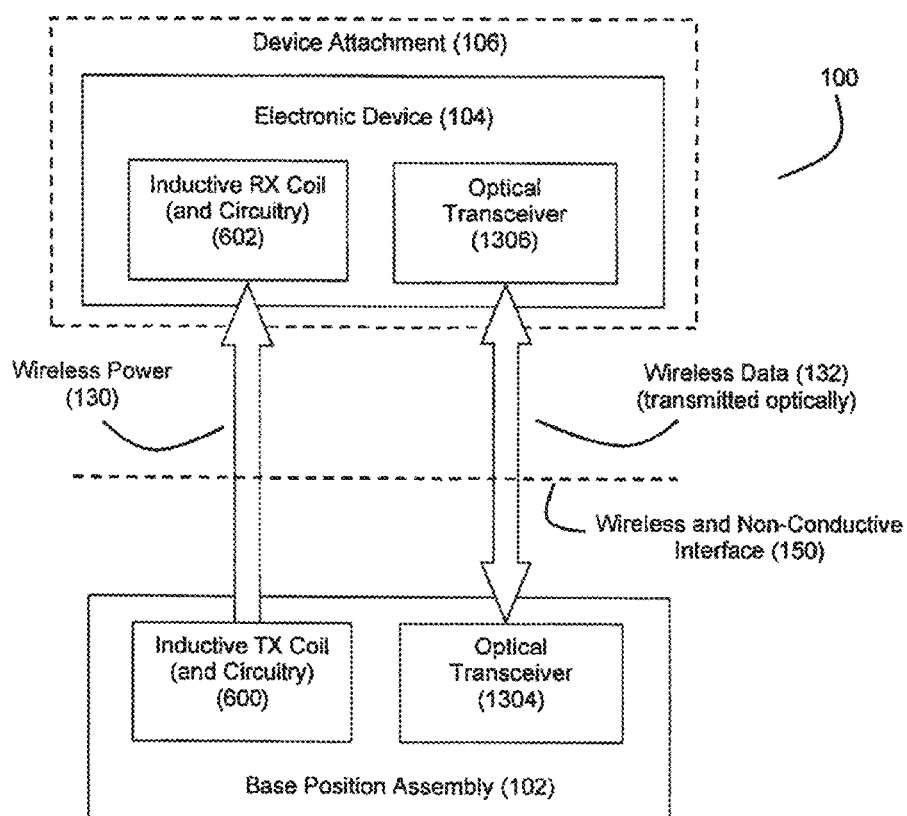
FIGS. 13A and 13B show example systems that combine inductive coupling for wireless power transmission with optical wireless data transceivers for wireless data transmission.
Figure 13B:
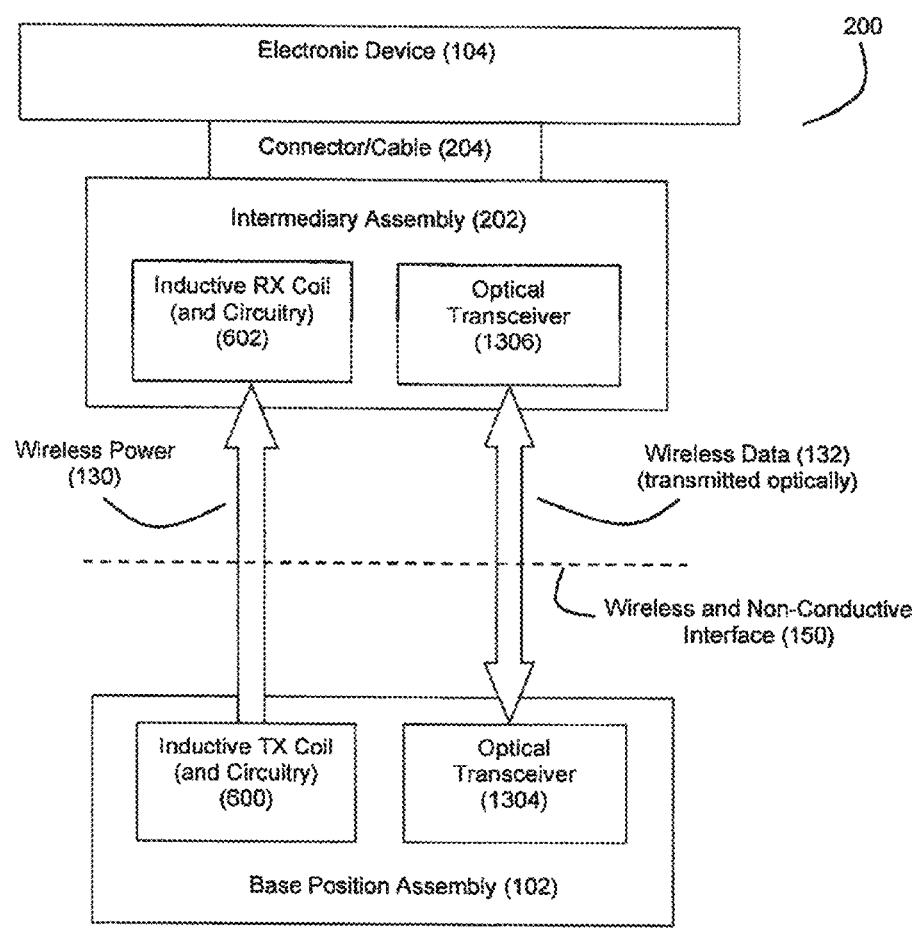

As another example, FIGS. 13A and 13B show example systems 100 and 200 respectively, where the wireless power transfer employs inductive RF coils 600 and 602 as wireless power transmitter 110 and wireless power receiver 120 respectively and where the wireless data transfer employs optical transceivers 1304 and 1306 in place of wireless data transceivers 112 and 122, respectively. The inductive coupling and optical communications can operate alongside each other with no interference. Moreover, alignment techniques such as those discussed above can be employed to align the coils 600/602 and optical transceivers 1304/1306 when the device 104 (which may include device attachment 106) and/or intermediary assembly 202 (and device 104) is placed on the base position assembly 102.

It is appreciated that the previous description of the disclosed embodiments is provided to enable any person skilled in the art to make or use the present disclosure.

Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A system comprising a merchandising display assembly that includes a wireless power transmitter and a wireless data transceiver,
   wherein the wireless power transmitter and the wireless data transceiver define a wireless and non-conductive interface over which wireless power and wireless data are transferable to a proximately located electronic device, and
   wherein the merchandizing display assembly includes a conduit located between the wireless data transceiver and a lens formed in a surface of the base position assembly, the conduit enabling transmission of the wireless data transmission to the lens.

2. The system of claim 1 wherein the merchandising display comprises an intermediary assembly.

3. The system of claim 1 wherein the merchandising display comprises a base position assembly.

4. The system of claim 1 wherein the merchandizing display assembly includes:
   a wireless power transmitter that emits a fluctuating magnetic field in response to receiving an alternating current; and
   a wireless data transceiver that generates a wireless data transmission in response to receiving data, wherein the magnetic field is emitted with a frequency of oscillation that does not overlap with a transmission frequency of the wireless data transmission.

5. The system of claim 1 wherein a surface of the merchandizing display assembly is contoured to act as a lens for propagation of the wireless data transmission away from the surface.

6. The system of claim 1 wherein the base merchandizing display assembly includes a lens for propagation of the wireless data transmission away from the base position assembly.

7. The system of claim 1 wherein the merchandizing display assembly includes a lens that focuses the wireless data transmission to a focal point located away from the base position assembly.

8. The system of claim 1 wherein the merchandizing display assembly includes a conduit located between the wireless data transceiver and a surface of the base position assembly, the conduit enabling transmission of the wireless data transmission to the surface.

9. A system comprising:
   an intermediary assembly having a wireless power receiver and a first wireless data transceiver for transferring electrical power and data to a connected electronic device; and
   a base position assembly having a wireless power transmitter and a second wireless data transceiver,
   wherein the wireless power receiver, the wireless power transmitter, the first wireless data transceiver, and the second wireless data transceiver define a wireless and non-conductive interface over which wireless power and wireless data are transferable to the intermediate assembly, and
   wherein the intermediate assembly includes
      a first lens for directing wireless data transmissions to and from the first wireless data transceiver; and
      the base position assembly includes a second lens for directing wireless data transmissions to and from the second wireless data transceiver.

10. The system of claim 9 wherein the wireless power transmitter emits a fluctuating magnetic field in response to receiving an alternating current, and the fluctuating magnetic field is converted into electrical power by the wireless power receiver when the intermediate assembly is located in proximity of the base position assembly.

11. The system of claim 9 wherein a surface of the intermediate assembly is contoured to form a first lens adjacent to the first wireless data transceiver, and a surface of the base position assembly is contoured to form a second lens adjacent to the second wireless data transceiver.

12. The system of claim 11 wherein the first lens is a first plano-convex lens and the second lens is a second plano-convex lens and the first lens and the second lens form a biconvex lens when the intermediate assembly is located proximate to the base position assembly.

13. The system of claim 9 further comprising:
   a first conduit located between the first wireless data transceiver and a first lens formed in a surface of the intermediary assembly; and
   a second conduit located between the second wireless data transceiver and a second lens formed in a surface of the base position assembly.

14. The system of claim 9 further comprising a curved conduit located between the first wireless data transceiver and a first lens formed in a surface the intermediary assembly, the curved conduit providing for wireless data transmission between the first wireless data transceiver and the first lens.

15. The system of claim 9 further comprises a flexible conduit located between the first wireless data transceiver and a first lens formed in a surface the intermediary assembly, the flexible conduit providing for wireless data transmission between the first wireless data transceiver and the first lens.

16. A merchandising display assembly comprising:
   a puck for attaching an electronic device; and
   a base having a wireless power transmitter and a first wireless data transceiver,
   wherein the wireless power transmitter and the first wireless data transceiver define a wireless and non-conductive interface over which wireless power is transferable to the electronic device in response to the puck being in proximity to the base position assembly, and,
   wherein a surface of the puck is contoured to form a first lens and a surface of the base is contoured to form a second lens over which wireless data is transferable to the electronic device in response to the puck being in proximity to the base position assembly.

17. The merchandising display assembly of claim 16 wherein the puck includes a wireless power receiver and a second wireless data transceiver.

18. The merchandising display assembly of claim 16 wherein in response to the puck being located proximate to the base, the wireless power transmitter and a wireless power receiver located in the puck transmit wireless power to the electronic device and the first wireless data transceiver and a second wireless data transceiver located in the puck enable wireless data transmission to and from the electronic device.

19. The merchandising display assembly of claim 16 wherein the wireless power transmitter emits a fluctuating magnetic field in response to receiving an alternating current, and the fluctuating magnetic field is converted by a wireless power receiver located in the puck into electrical power for use by the electronic device when the puck is located in proximity to the base.

20. The merchandising display assembly of claim 16 wherein the first lens and the second lens form a biconvex lens when the puck is located proximate to the base.

21. The merchandising display assembly of claim 16 further comprising:
   a first conduit located between the first wireless data transceiver and a first lens in the base; and
   a second conduit located between a second wireless data transceiver and a second lens in the puck.

* * * * *